(12) United States Patent
Nakamura et al.

(10) Patent No.: US 8,304,481 B2
(45) Date of Patent: Nov. 6, 2012

(54) THERMOPLASTIC RESIN COMPOSITION AND RESIN MOLDED PRODUCT

(75) Inventors: Makoto Nakamura, Hiratsuka (JP); Hiroshi Nakano, Hiratsuka (JP); Kiyoji Takagi, Hiratsuka (JP); Kouji Iwaki, Kitakyushu (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 12/923,341

(22) Filed: Sep. 15, 2010

(65) Prior Publication Data

US 2011/0009538 A1  Jan. 13, 2011

Related U.S. Application Data

(62) Division of application No. 12/281,733, filed as application No. PCT/JP2007/000145 on Feb. 28, 2007, now abandoned.

(30) Foreign Application Priority Data

Mar. 6, 2006 (JP) ................. 2006-060303
Mar. 6, 2006 (JP) ................. 2006-060304
Apr. 24, 2006 (JP) ................. 2006-118980

(51) Int. Cl.
*C08K 3/32* (2006.01)
*C08K 9/08* (2006.01)
*C08K 9/04* (2006.01)

(52) U.S. Cl. ......... 524/451; 524/417; 106/469; 106/487

(58) Field of Classification Search .................. 524/451, 524/417; 106/469, 487
See application file for complete search history.

(56) References Cited

U.S. PATENT DOCUMENTS

| | | | |
|---|---|---|---|
| 5,637,643 A | | 6/1997 | Umeda et al. |
| 5,989,510 A | * | 11/1999 | Abe et al. .............. 423/339 |
| 6,267,811 B1 | | 7/2001 | Cherukuri |
| 6,441,063 B1 | * | 8/2002 | Kudo et al. .................. 523/218 |
| 7,732,520 B2 | * | 6/2010 | Onizawa et al. ............. 524/449 |
| 2004/0116578 A1 | * | 6/2004 | Imanishi et al. .............. 524/445 |
| 2004/0178383 A1 | * | 9/2004 | Kikuchi ..................... 252/62 |
| 2004/0197561 A1 | * | 10/2004 | Suzuki et al. ................ 428/407 |
| 2005/0127330 A1 | * | 6/2005 | Hiraoka et al. ............... 252/500 |

FOREIGN PATENT DOCUMENTS

| | | |
|---|---|---|
| JP | 04309551 A * | 11/1992 |
| JP | 06 049343 A | 2/1994 |
| JP | 10101914 A | 4/1998 |
| JP | 2001019756 A | 1/2001 |
| JP | 2004217942 A | 8/2004 |
| JP | 2006-77176 | 3/2006 |
| JP | 2006077176 A | 3/2006 |
| JP | 2006-111822 | 4/2006 |
| WO | 02/42382 | 5/2002 |

OTHER PUBLICATIONS

CAPlus Abstract of JP 04-309551 (AN 1993-170372, 1992).*
Perry R.H. and Green D.W., "Perry's Chemical Engineers' Handbook", Table 21-6 U.S. Sieve Series and Tyler Equivalents (ASTM-E-11-61), crica 1984, 1 page.*
International Search Report for PCT/JP2007/000145, mailed Apr. 3, 2007.
Extended European Search Report in EP 07 71 3527.5.
Machine translated English equivalent of JP 2004217942 A, 10 pages.
Machine translated English equivalent of JP 2001019756 A, 15 pages.
Machine translated English equivalent of JP 2006077176 A, 21 pages.
Machine translated English equivalent of JP 10101914 A, 8 pages.

* cited by examiner

*Primary Examiner* — Ling Choi
*Assistant Examiner* — Brieann R Fink
(74) *Attorney, Agent, or Firm* — Nixon & Vanderhye P.C.

(57) ABSTRACT

Process for preparing a thermoplastic resin composition containing an aromatic polycarbonate resin which may include a thermoplastic resin other than the aromatic polycarbonate resin, a granular talc, and optionally a rubber polymer, a flame retardant or a fluorinated polyolefin. The granular talc has a particle size in which a proportion of a 500 μm-mesh screen residue thereof is not less than 55% by weight.

17 Claims, No Drawings

THERMOPLASTIC RESIN COMPOSITION AND RESIN MOLDED PRODUCT

This application is a divisional of application Ser. No. 12/281,733 filed Sep. 4, 2008 now abandoned, which in turn is the U.S. national phase of International Application No. PCT/JP2007/000145, filed 28 Feb. 2007, which designated the U.S. and claims priority to Japanese Application Nos. 2006-060303, filed 6 Mar. 2006, 2006-060304, filed 6 Mar. 2006 and 2006-118980 filed 24 Apr. 2006, the entire contents of each of which are hereby incorporated by reference.

TECHNICAL FIELD

The present invention relates to a thermoplastic resin composition and a resin molded product, and more particularly, to a thermoplastic resin composition obtained by incorporating a specific granular talc into a resin component comprising an aromatic polycarbonate resin which is enhanced in thermal stability, impact resistance, rigidity, extrusion moldability and flame retardancy, and exhibits an excellent balance between these properties, and a resin molded product obtained from the thermoplastic resin composition.

BACKGROUND ART

Aromatic polycarbonate resins have been used as general-purpose engineering plastics in various extensive applications such as parts of electric, electronic and OA equipments, mechanical parts and vehicle parts because the resins are excellent in various properties such as transparency, impact resistance, heat resistance and dimensional stability. In addition, polymer alloys comprising an aromatic polycarbonate resin and a thermoplastic polyester resin are known as materials that are improved in chemical resistance and moldability as poor properties of the aromatic polycarbonate resins while maintaining the above excellent properties inherent to the aromatic polycarbonate resins, and have been used in the applications such as interior and exterior parts and outside plate parts for vehicles and various housing members, as well as in the other extensive applications.

In order to improve a rigidity and a dimensional stability of the polymer alloys comprising an aromatic polycarbonate resin and a thermoplastic resin other than the aromatic polycarbonate resin such as a thermoplastic polyester resin, in general, there is widely known a method of incorporating an inorganic filler such as glass fiber and talc into the polymer alloys. However, when the glass fiber is blended in the polymer alloys, a molded product obtained from such polymer alloys tends to be deteriorated in appearance on the surface thereof, resulting in only limited applications to exterior parts and outside plate parts for vehicles requiring a good appearance.

On the other hand, although the resin composition containing a talc provides a molded product having a good appearance, decomposition of the aromatic polycarbonate resin as well as transesterification reaction between the aromatic polycarbonate resin and the thermoplastic polyester resin tend to excessively proceed owing to a strong basicity of the talc, resulting in poor thermal stability of the resin composition.

In particular, there is such a recent tendency that exterior parts and outside plate parts for vehicles are required to have a large size and a high rigidity as a molded product. Therefore, it has been demanded to provide such a material capable of exhibiting excellent thermal stability and impact resistance. Also, as to the impact resistance required for these molded products, an elongation at break or a surface impact strength becomes more important than Izod impact strength owing to the relation with strain rate. As a result, it is required to provide a material capable of improving these impact properties by blending a talc in the resin composition.

To solve the problem concerning poor thermal stability of the resin composition when blending a talc therein, there have been proposed a resin composition containing a specific rubber polymer (for example, refer to Patent Document 1), a resin composition containing a specific phosphorus-based stabilizer (for example, refer to Patent Documents 2 and 3), and a resin composition using a surface-treated talc (for example, refer to Patent Document 4). However, in these conventional techniques, the obtained resin compositions tend to be unsatisfactory in thermal stability and impact resistance. Therefore, it has been strongly required to improve these properties of the resin compositions.

On the other hand, there have been proposed a resin composition using a talc that is increased in bulk specific gravity by mechanical compression (for example, refer to Patent Documents 5 and 6), and a resin composition using a talc having a limited electric conductivity (for example, refer to Patent Document 7). In the Patent Document 7, it is described that the talc is preferably in the form of a compressed and granulated product, and the talc may be granulated using a binder.

However, in the conventional techniques specifically illustrated in these Patent Documents, the obtained resin compositions are still unsatisfactory in thermal stability and impact resistance. Further, in Patent Document 8, there has been proposed the technique concerning such a talc that is formed into granules using a binder, and it is described that polycarbonate resins, polyester resins, rubber-based resins as well as plural kinds of these resins may be used as the binder. However, the technique described in the Patent Document 8 neither teaches nor suggests the above problems caused upon blending the talc in the aromatic polycarbonate resins. Therefore, it is not possible to obtain a resin composition having satisfactory thermal stability and impact resistance only by blending the granular talc in the aromatic polycarbonate resins.

In addition, although the aromatic polycarbonate resins have been used in extensive applications, among them, in the applications such as parts of electric, electronic and OA equipments, these products have been strongly required to exhibit especially a good flame retardancy. For this reason, there is extensively known such a general technique of blending various flame retardants in the aromatic polycarbonate resins to impart a good flame retardancy thereto.

As the resin composition containing a flame retardant, such resin compositions containing a halogen-based flame retardant such as bromine compounds have been used for a long time. These resin compositions exhibit a high flame retardancy, but suffer from the problem concerning high burden on environments. Therefore, there have been proposed a number of resin compositions containing a non-halogen-based flame retardant.

Further, the aromatic polycarbonate resins tend to be deteriorated in fluidity. Therefore, resin compositions obtained by incorporating an organic phosphate-based flame retardant into a polymer alloy comprising an aromatic polycarbonate resin and a styrene-based resin such as acrylonitrile-butadiene-styrene copolymer (ABS resin) have been extensively used especially in the applications of housings for OA equipments such as personal computers and printers.

In recent years, in the applications of parts of electric, electronic and OA equipments, the thickness thereof has been rapidly reduced, so that it has been demanded to provide a material capable of exhibiting a good appearance and a high rigidity. For instance, there has been proposed a flame-retardant resin composition containing an inorganic filler having a small particle size such as talc (for example, refer to Patent Document 9). However, the resin compositions obtained by blending the talc in aromatic polycarbonate resins tend to suffer from problems such as decomposition of the aromatic polycarbonate resins and, therefore, poor thermal stability and impact resistance owing to a strong basicity of the talc, notwithstanding such an advantage that the molded product obtained therefrom can exhibit a good appearance. Further, the resin compositions containing the non-halogen-based flame retardant also tend to suffer from such a problem that the flame retardancy of these compositions is deteriorated as the content of the talc therein increases.

To solve the above problems, there has been proposed a flame-retardant resin composition containing a surface-treated inorganic filer (for example, refer to Patent Documents 10 to 12). However, in the conventional techniques described in these Patent Documents, the obtained resin compositions are still unsatisfactory in flame retardancy and thermal stability. Further, when blending a talc having a small particle size in the resin compositions, there tend to arise problems such as clogging of a hopper, deteriorated extrusion moldability such as poor intrusion into an extruder, and poor impact resistance of the resultant resin composition owing to poor dispersion of the talc therein.

As described above, in the application fields of the thermoplastic resin compositions comprising an aromatic polycarbonate resin into which a talc having a small particle size and a non-halogen-based flame retardant are blended, it has been strongly demanded to develop the techniques for enhancing an extrusion moldability, a rigidity, a flame retardancy, an impact resistance and a thermal stability thereof.

To solve the above conventional problems, there have been proposed a resin composition using a talc that is increased in bulk specific gravity by mechanical compression (for example, refer to Patent Document 5), and a resin composition using a talc having a limited electric conductivity (for example, refer to Patent Document 7). In particular, in the Patent Document 7, it is described that the talc is preferably in the form of a compressed and granulated product, and the talc may be granulated using a binder. However, in these Patent documents, no specific examples concerning such features of the resin compositions are described, and further the obtained resin compositions are still unsatisfactory in extrusion moldability, flame retardancy, impact resistance and thermal stability.

On the other hand, there have been proposed the technique concerning an inorganic filler that is formed into a granular shape using a binder (for example, refer to Patent Document 8), and a thermoplastic resin composition obtained by blending a granular talc granulated using a specific amount of bentonite, in an aromatic polycarbonate resin (for example, refer to Patent Document 13). However, in these Patent Documents, it is merely described that the flame retardant may be blended in the composition, but there is no description concerning a resin composition comprising an aromatic polycarbonate resin, and a granular talc and a non-halogen-based flame retardant blended in the resin which is excellent in flame retardancy and thermal stability.

Patent Document 1: Japanese Patent Application Laid-Open (KOKAI) No. 2001-294741
Patent Document 2: Japanese Patent Application Laid-Open (KOKAI) No. 5-222283 (1993)
Patent Document 3: Japanese Patent Application Laid-Open (KOKAI) No. 6-49343 (1994)
Patent Document 4: Japanese Patent Application Laid-Open (KOKAI) No. 8-127711 (1996)
Patent Document 5: Japanese Patent Application Laid-Open (KOKAI) No. 8-176339 (1996)
Patent Document 6: Japanese Patent Application Laid-Open (KOKAI) No. 10-101914 (1998)
Patent Document 7: Japanese Patent Application Laid-Open (KOKAI) No. 2002-60637
Patent Document 8: Japanese Patent Application Laid-Open (KOKAI) No. 2002-220549
Patent Document 9: Japanese Patent Application Laid-Open (KOKAI) No. 2003-134304
Patent Document 10: Japanese Patent Application Laid-Open (KOKAI) No. 10-338805 (1998)
Patent Document 11: Japanese Patent Application Laid-Open (KOKAI) No. 2005-48072
Patent Document 12: Japanese Patent Application Laid-Open (KOKAI) No. 2005-220216
Patent Document 13: Japanese Patent Application Laid-Open (KOKAI) No. 2006-77176

DISCLOSURE OF THE INVENTION

Problem to be Solved by the Invention

An object, of the present invention is to overcome the above problems encountered in the prior art, and provide a thermoplastic resin composition capable of exhibiting excellent extrusion moldability, rigidity, flame retardancy, impact resistance and thermal stability, and an excellent balance between these properties, as well as a resin molded product obtained from the thermoplastic resin composition.

Means for Solving the Problem

As a result of the present inventors' earnest study for solving the above conventional problems, it has been found that (1) the thermoplastic resin composition prepared by blending a granular talc having specific bulk density and particle size in a specific resin composition mainly comprising an aromatic polycarbonate resin and a thermoplastic resin other than the aromatic polycarbonate resin can be enhanced in all of thermal stability, impact resistance and rigidity, and exhibit an excellent balance between these properties; (2) the thermoplastic resin composition prepared by blending a specific amount of a rubber polymer in a resin composition mainly comprising an aromatic polycarbonate resin and a granular talc having specific bulk density and particle size can exhibit excellent thermal stability, impact resistance and rigidity; and (3) the thermoplastic resin composition prepared by blending a specific granular talc and a specific flame retardant in a resin component comprising an aromatic polycarbonate resin can be enhanced in all of extrusion moldability, rigidity, flame retardancy, impact resistance and thermal stability, and exhibit an excellent balance between these properties. The present invention has been attained on the basis of the above finding.

That is, in a first aspect of the present invention, there is provided a thermoplastic resin composition comprising:

40 to 99 parts by weight of a resin component (component A) comprising 10 to 90% by weight of an aromatic polycarbonate resin (component A1) and 90 to 10% by weight of a thermoplastic resin other than the aromatic polycarbonate resin (component A2) with the proviso that a total content of the components A1 and A2 is 100% by weight;

1 to 60 parts by weight of a granular talc (component B) having a bulk density of 0.4 to 1.5 g/mL which is obtained by granulating a talc having an average particle size of 0.1 to 10 μm; and 0 to 35 parts by weight of a rubber polymer (component C), wherein the granular talc (component B) has a particle size in which a proportion of a 500 μm-mesh screen residue thereof is not less than 55% by weight.

In a second aspect of the present invention, there is provided a resin molded product produced by molding the thermoplastic resin composition as defined in the above first aspect.

In a third aspect of the present invention, there is provided a thermoplastic resin composition comprising:

40 to 99 parts by weight of an aromatic polycarbonate resin (component A);

1 to 60 parts by weight of a granular talc (component B) having a bulk density of 0.4 to 1.5 g/mL which is obtained by granulating a talc having an average particle size of 0.1 to 10 μm; and a rubber polymer (component C) in an amount of 3 to 35 parts by weight on the basis of 100 parts by weight of a total amount of the components A and B, wherein the granular talc (component B) has a particle size in which a proportion of a 500 μm-mesh screen residue thereof is not less than 55% by weight.

In a fourth aspect of the present invention, there is provided a resin molded product produced by molding the thermoplastic resin composition as defined in the above third aspect.

In a fifth aspect of the present invention, there is provided a thermoplastic resin composition comprising:

40 to 99 parts by weight of a resin component (component A) comprising 50 to 100% by weight of an aromatic polycarbonate resin (component A1) and 50 to 0% by weight of a thermoplastic resin other than the aromatic polycarbonate resin (component A2) with the proviso that a total content of the components A1 and A2 is 100% by weight;

1 to 60 parts by weight of a granular talc (component B) having a bulk density of 0.4 to 1.5 g/mL which is obtained by granulating a talc having an average particle size of 0.1 to 10 μm; and at least one flame retardant (component E) selected from the group consisting of an organic alkali metal salt and/or an organic alkali earth metal salt (component E1), an organophosphorus-based flame retardant (component E2) and a silicone-based resin (component E3); and a fluorinated polyolefin (component F), said components E and F being present in amounts of 0.01 to 40 parts by weight and 0.01 to 5 parts by weight, respectively, on the basis of 100 parts by weight of a total amount of the components A and B, wherein the granular talc (component B) has a particle size in which a proportion of a 500 μm-mesh screen residue thereof is not less than 55% by weight.

In a sixth aspect of the present invention, there is provided a resin molded product produced by molding the thermoplastic resin composition as defined in the above fifth aspect.

Effect of the Invention

The thermoplastic resin composition as described in the first aspect of the present invention has such an advantage that the resin composition is excellent in all of thermal stability, impact resistance and rigidity, and exhibits an excellent balance between these properties. The thermoplastic resin composition according to the first aspect of the present invention which has the above advantage can be used in various extensive applications. Specific examples of the applications of the thermoplastic resin composition according to the first aspect of the present invention include parts of electric and electronic equipments, parts of OA equipments, mechanical parts, vehicle parts, building members, various containers, leisure goods, sundries, various housings for cellular phones, etc. In addition, the thermoplastic resin composition according to the first aspect of the present invention can also be suitably used especially as exterior parts, outside plate parts and interior parts for vehicles because the resin composition is excellent in not only a balance between thermal stability, impact resistance and rigidity, but also chemical resistance and appearance.

The thermoplastic resin composition as described in the third aspect of the present invention has such an advantage that the resin composition is excellent in thermal stability, impact resistance and rigidity. The thermoplastic resin composition according to the third aspect of the present invention which has the above advantage can be used in various extensive applications. Specifically, the thermoplastic resin composition according to the third aspect of the present invention can be usefully used in the applications such as electric and electronic equipments or parts thereof, OA equipments, information terminal equipments, mechanical parts, domestic appliances, vehicle parts, building members, various containers, leisure goods, sundries, various illumination equipments, etc. In particular, it is expected that the thermoplastic resin composition according to the third aspect of the present invention can also be applied to housing members for electric and electronic equipments, OA equipments and information terminal equipments, and exterior parts, outside plate parts and interior parts for vehicles.

The thermoplastic resin composition as described in the fifth aspect of the present invention has such an advantage that the resin composition is enhanced in all of extrusion moldability, rigidity, flame retardant, impact resistance and thermal stability, and exhibits an excellent balance between these properties. The thermoplastic resin composition according to the third aspect of the present invention which has the above advantage can be used in various extensive applications. Specifically, the thermoplastic resin composition according to the fifth aspect of the present invention can be usefully used in the applications such as parts of electric and electronic equipments, OA equipments, mechanical parts, vehicle parts, building members, various containers, leisure goods, sundries, and parts of information terminal equipments such as cellular phones. In particular, the thermoplastic resin composition according to the fifth aspect of the present invention are suitably used especially as parts of electric and electronic equipments, parts of OA equipments and parts of information terminal equipments.

Specific examples of the housing members and parts of electric and electronic equipments, OA equipments and information terminal equipments include displays of personal computers, game equipments, televisions, etc., and housing members or inside parts of printers, copying machines, scanners, facsimiles, electronic pocket books or PDA, battery packs, cameras, video cameras, cellular phones, driving devices or readers for recording media, etc.

Specific examples of the exterior parts and outside plate parts for vehicles include outer door handles, bumpers, fenders, door panels, trunk lids, front panels, rear panels, roof panels, bonnets, pillars, side moldings, garnishes, wheel caps, hood bulges, fuel lids, various spoilers, and cowlings of motorcycles. Specific examples of the interior parts for vehicles include inner door handles, center panels, instrument panels, console boxes, luggage floor boards, and housings of displays for car navigation, etc.

PREFERRED EMBODIMENTS FOR CARRYING OUT THE INVENTION

The present invention is described in detail below. However, the following detailed descriptions are concerned with only typical examples of preferred embodiments of the present invention, and not intended to limit the scope of the present invention thereto. In the following descriptions, the thermoplastic resin composition is occasionally referred to merely as a "resin composition". Meanwhile, in the present specification, the "group" contained in various compounds involves both substituted and unsubstituted groups, unless departing from the scope of the present invention.

First, the thermoplastic resin composition according to the first aspect of the present invention is described. The thermoplastic resin composition according to the first aspect of the present invention comprises 40 to 99 parts by weight of a resin component (component A) comprising 10 to 90% by weight of an aromatic polycarbonate resin (component A1) and 90 to 10% by weight of a thermoplastic resin other than the aromatic polycarbonate resin (component A2) with the proviso that a total content of the components A1 and A2 is 100% by weight; 1 to 60 parts by weight of a granular talc (component B) having a bulk density of 0.4 to 1.5 g/mL which is obtained by granulating a talc having an average particle size of 0.1 to 10 μm; and 0 to 35 parts by weight of a rubber polymer (component C), wherein the granular talc (component B) has a particle size in which a proportion of a 500 μm-mesh screen residue thereof is not less than 55% by weight.

Aromatic Polycarbonate Resin (Component A1):

The aromatic polycarbonate resin as the component A1 of the thermoplastic resin composition according to the first aspect of the present invention (hereinafter referred to merely as the "component A1") is a linear or branched thermoplastic aromatic polycarbonate in the form of a polymer or copolymer which is obtained, for example, by reacting an aromatic dihydroxy compound and a carbonate precursor, or by reacting these compounds with a small amount of a polyhydroxy compound, etc.

The aromatic polycarbonate resin (component A1) used in the present invention is not particularly limited, and may be produced by suitable known method such as, for example, an interfacial polymerization method, a melting transesterification method, a pyridine method, a ring-opening polymerization method of cyclic carbonate compounds, and a solid-state transesterification method of prepolymers.

Examples of the aromatic dihydroxy compound used as a raw material of the aromatic polycarbonate resin include bis(hydroxyaryl)alkanes such as 2,2-bis(4-hydroxyphenyl)propane(=bisphenol A), 2,2-bis(3,5-bibromo-4-hydroxyphenyl)propane(=tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-bromo-4-hydroxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane, bis(4-hydroxyphenyl)diphenylmethane, 2,2-bis(4-hydroxyphenyl)-1,1,1-trichloropropane, 2,2-bis(4-hydroxyphenyl)-1,1,1,3,3,3-hexachloropropane and 2,2-bis(4-hydroxyphenyl)-1,1,1,3,3,3-hexafluoropropane; bis(hydroxyaryl)cycloalkanes such as 1,1-bis(4-hydroxyphenyl)cyclopentane, 1,1-bis(4-hydroxyphenyl)cyclohexane and 1,1-bis(4-hydroxyphenyl)-3,3,5-trimethylcyclohexane; bisphenols having a cardo structure such as 9,9-bis(4-hydroxyphenyl)fluorene and 9,9-bis(4-hydroxy-3-methylphenyl)fluorene; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone; resorcin; and 4,4'-dihydroxydiphenyl.

Among the above aromatic dihydroxy compounds, preferred are bis(4-hydroxyphenyl)alkanes, and more preferred is 2,2-bis(4-hydroxyphenyl)propane[=bisphenol A] from the viewpoint of a good impact resistance of the resultant resin composition. These aromatic dihydroxy compounds may be used alone or in combination of any two or more thereof.

Examples of the above carbonate precursor to be reacted with the aromatic dihydroxy compound include carbonyl halides, carbonic acid esters and haloformates. Specific examples of the carbonate precursor include phosgene; diaryl carbonates such as diphenyl carbonate and ditolyl carbonate; dialkyl carbonates such as dimethyl carbonate and diethyl carbonate; and dihaloformates of dihydric phenols. These carbonate precursors may be used alone or in combination of any two or more thereof.

Also, the aromatic polycarbonate resin (component A1) may be in the form of a branched aromatic polycarbonate resin obtained by copolymerizing a tri- or more polyfunctional aromatic compound therewith. Examples of the tri- or more polyfunctional aromatic compound include polyhydroxy compounds such as fluoroglucin, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3,1,3,5-tri(4-hydroxyphenyl)benzene and 1,1,1-tri(4-hydroxyphenyl)ethane; 3,3-bis(4-hydroxyaryl)oxyindole(=isatin bisphenol); 5-chloroisatin; 5,7-dichloroisatin; and 5-bromoisatin. Among these polyfunctional aromatic compounds, preferred is 1,1,1-tri(4-hydroxyphenyl)ethane. The polyfunctional aromatic compound may be used by replacing a part of the above aromatic dihydroxy compound therewith. The amount of the polyhydroxy aromatic compound used is preferably 0.01 to 10 mol % and more preferably 0.1 to 2 mol % on the basis of the aromatic dihydroxy compound.

Next, the processes for producing the component A1 used in the present invention are described. Among these production processes of the component A1, the production process using an interfacial polymerization method is first explained. In the polymerization reaction of the production process, the aromatic dihydroxy compound is first reacted with phosgene in the presence of an organic solvent inert to the reaction and an alkali aqueous solution while maintaining the reaction system at a pH of usually not less than 9, if required, using a molecular weight controller (end stopping agent) and an antioxidant for preventing oxidation of the aromatic dihydroxy compound, and then a polymerization catalyst such as a tertiary amine or a quaternary ammonium salt is added to the reaction system to conduct an interfacial polymerization therebetween, thereby obtaining a polycarbonate. The time of addition of the molecular weight controller is not particularly limited, and the molecular weight controller may be added at any time between the reaction with phosgene and initiation of the polymerization reaction without particular limitations. Meanwhile, the reaction temperature is, for example, 0 to 40° C., and the reaction time is, for example, from several minutes (for example, 10 min) to several hours (for example, 6 hr).

Examples of the organic solvent inert to the reaction include chlorinated hydrocarbons such as dichloromethane, 1,2-dichloroethane, chloroform, monochlorobenzene and dichlorobenzene; and aromatic hydrocarbons such as benzene, toluene and xylene. Examples of the alkali compound used for preparing the aqueous alkali solution include hydroxides of alkali metals such as sodium hydroxide and potassium hydroxide.

Examples of the molecular weight controller include compounds containing a monovalent phenolic hydroxyl group. Specific examples of the compounds containing a monovalent phenolic hydroxyl group include m-methyl phenol, p-methyl phenol, m-propyl phenol, p-propyl phenol, p-tert-butyl phenol and p-long chain alkyl-substituted phenols. The amount of the molecular weight controller used is preferably 50 to 0.5 mol and more preferably 30 to 1 mol on the basis of 100 mol of the aromatic dihydroxy compound.

Examples of the polymerization catalyst include tertiary amines such as trimethylamine, triethylamine, tributylamine, tripropylamine, trihexylamine and pyridine; and quaternary ammonium salts such as trimethylbenzyl ammonium chloride, tetramethyl ammonium chloride and triethylbenzyl ammonium chloride.

Next, the production process using a melting transesterification method is explained. The polymerization reaction of the production process may be conducted, for example, by subjecting a carbonic diester and an aromatic dihydroxy compound to transesterification reaction. Examples of the carbonic diester include dialkyl carbonate compounds such as dimethyl carbonate, diethyl carbonate and di-tert-butyl carbonate; diphenyl carbonate; and substituted diphenyl carbonates such as ditolyl carbonate. Among these carbonic diesters, preferred are diphenyl carbonate and substituted diphenyl carbonates, and more preferred is diphenyl carbonate.

Also, the amount of an end hydroxyl group contained in the aromatic polycarbonate resin has a large influence on thermal stability, hydrolysis stability and color tone of the obtained polycarbonate products, and, therefore, may be appropriately controlled by conventionally known optional methods. In the case of the melting transesterification process, the mixing ratio between the carbonic diester and the aromatic dihydroxy compound as well as the vacuum degree used upon the transesterification reaction are usually controlled to thereby obtain an aromatic polycarbonate having a desired molecular weight in which the amount of the end hydroxyl group is desirably adjusted.

In the melting transesterification reaction, the carbonate diester is usually used in not less than an equimolar amount and preferably in an amount of 1.01 to 1.30 mol on the basis of 1 mol of the aromatic dihydroxy compound. In order to positively control the amount of the end hydroxyl group, there may be used such a method of separately adding an end stopping agent upon the reaction. Examples of the end stopping agent include monohydric phenols, monovalent carboxylic acids and carbonic diesters.

Upon producing the polycarbonates by the melting transesterification method, the reaction is usually conducted in the presence of a transesterification catalyst. The transesterification catalyst used in the reaction is not particularly limited, and is preferably an alkali metal compound and/or an alkali earth metal compound. The transesterification catalyst may be used in combination with a basic compound as an auxiliary component such as a basic boron compound, a basic phosphorus compound, a basic ammonium compound and an amine-based compound. The transesterification reaction using the above raw materials may be conducted at a temperature of 100 to 320° C., and then the transesterification reaction product may be subjected to melt-polycondensation reaction under reduced pressure finally reaching not more than 2 mm Hg, while removing by-products such as aromatic hydroxy compounds from the reaction mixture.

The melt-polycondensation may be conducted by either a batch method or a continuous method, and is preferably conducted by a continuous method from the viewpoints of a good stability, etc., of the aromatic polycarbonate resin used in the present invention and the resultant resin composition of the present invention. Examples of the preferred catalyst deactivator used in the melting transesterification method include compounds capable of neutralizing the transesterification catalyst, for example, sulfur-containing acid compounds and derivatives formed therefrom. Such a compound capable of neutralizing the transesterification catalyst is added in an amount of preferably 0.5 to 10 equivalents and more preferably 1 to 5 equivalents on the basis of the alkali metal contained in the catalyst, and further preferably 1 to 100 ppm and more preferably 1 to 20 ppm on the basis of the polycarbonate.

The molecular weight of the aromatic polycarbonate resin (component A1) used in the present invention may be optionally determined, and is controlled such that the viscosity-average molecular weight [Mv] calculated from a solution viscosity thereof is preferably in the range of 10,000 to 50,000. The aromatic polycarbonate having a viscosity-average molecular weight of not less than 10,000 tends to be further improved in mechanical strength, and can be therefore more suitably used in the applications requiring a higher mechanical strength. Whereas, the aromatic polycarbonate having a viscosity-average molecular weight of not more than 50,000 tends to be more effectively prevented from undergoing deterioration in fluidity, and is more preferable from the viewpoint of facilitated molding process.

The viscosity-average molecular weight of the aromatic polycarbonate resin (component A1) is more preferably 12,000 to 40,000 and still more preferably 14,000 to 30,000. Also, two or more kinds of aromatic polycarbonate resins that are different in viscosity-average molecular weight from each other may be used in the form of a mixture thereof. Further, the above aromatic polycarbonate resin may also be mixed with those aromatic polycarbonate resins having a viscosity-average molecular weight which is out of the above-specified range, if required.

The viscosity-average molecular weight [Mv] used herein means the value calculated from an intrinsic viscosity [$\eta$] (unit: dL/g) as measured at 20° C. in methylene chloride as a solvent using an Ubbellohde viscometer, according to Schnell's viscosity formula: $\eta = 1.23 \times 10^{-4} M^{0.83}$ wherein the intrinsic viscosity [$\eta$] is the value calculated from a specific viscosity [$\eta_{sp}$] as measured at each solution concentration [C] (g/dL) according to the following formula:

$$\eta = \lim_{c \to 0} \eta_{sp}/C.$$

The end hydroxyl group concentration of the aromatic polycarbonate resin used in the present invention is usually not more than 1000 ppm, preferably not more than 800 ppm and more preferably not more than 600 ppm. The lower limit of the end hydroxyl group concentration of the aromatic polycarbonate resin, in particular, such an aromatic polycarbonate resin produced by transesterification method, is not less than 10 ppm, preferably not less than 30 ppm and more preferably not less than 40 ppm.

When the end hydroxyl group concentration of the aromatic polycarbonate resin is controlled to not less than 10 ppm, the aromatic polycarbonate resin is prevented from undergoing reduction in a molecular weight thereof, resulting in such a tendency that the obtained resin composition is further enhanced in mechanical properties. Also, when the end hydroxyl group concentration of the aromatic polycarbonate resin is controlled to not more than 1000 ppm, the obtained resin composition tends to be further enhanced in retention thermal stability and color tone. Meanwhile, the unit of the above end hydroxyl group concentration expressed by "ppm" represents a weight of the end hydroxyl group based on the weight of the aromatic polycarbonate resin. The end hydroxyl group concentration may be measured by colorimetric quantity determination using a titanium tetrachloride/acetic acid method (the method described in "Macromol. Chem.", 88, 215 (1965)).

In addition, the aromatic polycarbonate resin (component A1) used in the present invention may also contain an aromatic polycarbonate oligomer in order to improve an appearance of a molded product obtained therefrom as well as a fluidity of the resin composition. The viscosity-average molecular weight [Mv] of the aromatic polycarbonate oligomer is preferably 1,500 to 9,500 and more preferably 2,000 to 9,000. The aromatic polycarbonate oligomer is usually used in an amount of not more than 30% by weight based on the weight of the component A1.

Further, in the present invention, as the aromatic polycarbonate resin (component A1), there may also be used not only the virgin resin, but also those aromatic polycarbonate resins regenerated from used resin products, i.e., so-called material-recycled aromatic polycarbonate resins. Examples of the used resin products include optical recording media such as optical discs, light guide plates, transparent members for vehicles such as automobile window glass, automobile headlamp lenses and windshields, containers such as water bottles, spectacle lenses, and building materials such as sound insulating walls, glass windows and corrugated sheets. Further, there may also be used nonconforming products and crushed or pulverized products obtained from sprues and runners as well as pellets obtained by melting these products. The amount of the regenerated aromatic polycarbonate resin used is preferably not more than 80% by weight and more preferably not more than 50% by weight based on the weight of the component A1.

Thermoplastic Resin Other than Aromatic Polycarbonate Resin (Component A2):

As the thermoplastic resin other than aromatic polycarbonate resin which is used as the component A2 in the present invention (hereinafter occasionally referred to merely as the "component A2"), there may be used various known optional thermoplastic resins. Specific examples of the thermoplastic resin include thermoplastic polyester resins such as polyethylene terephthalate resin, polytrimethylene terephthalate resin and polybutylene terephthalate resin; styrene-based resins such as polystyrene resin, high-impact polystyrene resin (HIPS), acrylonitrile-styrene copolymer (AS resin), acrylonitrile-butadiene-styrene copolymer (ABS resin), acrylonitrile-styrene-acrylic rubber resin (ASA resin) and acrylonitrile-ethylene/propylene-based rubber-styrene copolymer (AES resin); polyolefin resins such as polyethylene resin and polypropylene resin; polyamide resins; polyimide resins; polyether imide resins; polyurethane resins; polyphenylene ether resins; polyphenylene sulfide resins; polysulfone resins; and polymethacrylate resins. These thermoplastic resins may be used alone or in combination of any two or more thereof. Among these thermoplastic resins, the thermoplastic polyester resins are especially preferred from the viewpoints of a good thermal stability and a good rigidity.

The thermoplastic polyester resins which are especially preferably used as the component A2 in the present invention are in the form of a polymer or copolymer obtained by subjecting a dicarboxylic acid component comprising a dicarboxylic acid or a reactive derivative thereof, and a diol component comprising a diol or an ester derivative thereof, to condensation reaction.

The thermoplastic polyester resins (component A2) used in the present invention may be produced by any optional method. In general, the thermoplastic polyester resins may be produced by reacting the dicarboxylic acid component and the diol component under heating in the presence of a polycondensation catalyst containing titanium, germanium, antimony, etc., while discharging water and lower alcohols as by-products from the reaction system. The condensation reaction may be conducted by either a batch polymerization method or a continuous polymerization method. Further, the resultant polymer or copolymer may be subjected to solid-state polymerization to increase a polymerization degree thereof.

The dicarboxylic acid may be either an aromatic dicarboxylic acid or an aliphatic dicarboxylic acid. Among them, the aromatic dicarboxylic acid is preferred from the viewpoints of a good heat resistance and a good dimensional stability. Specific examples of the aromatic dicarboxylic acid include terephthalic acid, isophthalic acid, orthophthalic acid, 1,5-naphthalene dicarboxylic acid, 2,6-naphthalene dicarboxylic acid, 4,4'-biphenyl dicarboxylic acid, 4,4'-biphenylether dicarboxylic acid, 4,4'-biphenylmethane dicarboxylic acid, 4,4'-biphenylsulfone dicarboxylic acid, 4,4'-biphenylisopropylidene dicarboxylic acid, 1,2-bis(phenoxy)ethane-4,4'-dicarboxylic acid, 2,5-anthracene dicarboxylic acid, 2,6-anthracene dicarboxylic acid, 4,4'-p-terphenylene dicarboxylic acid and 2,5-pyridine dicarboxylic acid. In addition, there may also be used substituted products of these acids (for example, alkyl-substituted products such as 5-methyl isophthalic acid) as well as reactive derivatives of these acids (for example, alkyl ester derivatives such as dimethyl terephthalate and diethyl terephthalate).

Among these compounds, more preferred are terephthalic acid, 2,6-naphthalene dicarboxylic acid and alkyl ester derivatives thereof, and still more preferred are terephthalic acid and alkyl ester derivatives thereof. These aromatic dicarboxylic acids may be used alone or in combination of any two or more thereof. These aromatic dicarboxylic acids may also be used in combination with one or more kinds of aliphatic dicarboxylic acids such as adipic acid, azelaic acid, sebacic acid and dodecanedioic acid, and alicyclic dicarboxylic acid such as cyclohexanedicarboxylic acid.

Specific examples of the diol include aliphatic diols such as ethylene glycol, 1,2-propylene glycol, 1,3-propanediol, 1,4-butanediol, neopentyl glycol, 1,5-pentanediol, 1,6-hexanediol, decamethylene glycol and 2,2-dimethyl-1,3-propanediol; alicyclic diols such as 1,4-cyclohexanedimethanol, 1,3-cyclohexanedimethanol, cyclohexanediol and trans- or cis-2,2,4,4-tetramethyl-1,3-cyclobutanediol; aromatic diols such as p-xylylenediol, bisphenol A, tetrabromobisphenol A and tetrabromobisphenol A-bis(2-hydroxyethyl ether); and substituted products thereof.

Among these diols, from the viewpoints of good thermal stability, impact resistance and rigidity, preferred are ethylene glycol, 1,3-propanediol, 1,4-butanediol and 1,4-cyclohexanedimethanol, more preferred are ethylene glycol, 1,3-propanediol and 1,4-butanediol, and most preferred is ethylene glycol. These diols may be used alone or in combination of any two or more thereof. Further, as the diol component, the above diols may be used in combination with one or more long-chain diols having a molecular weight of 400 to 6,000 such as polyethylene glycol, poly-1,3-propylene glycol and polytetramethylene glycol, and both may be copolymerized with the dicarboxylic acid component.

Specific examples of the suitable thermoplastic polyester resin used as the component A2 in the present invention include polyethylene terephthalate resin (PET), polypropylene terephthalate resin (PPT), polybutylene terephthalate resin (PBT), polyhexylene terephthalate resin, polyethylene naphthalate resin (PEN), polybutylene naphthalate resin (PBN), poly(1,4-cyclohexanedimethylene terephthalate) resin (PCT) and polycyclohexylcyclohexylate (PCC). Among these thermoplastic polyester resins, polyethylene terephthalate resin (PET), polypropylene terephthalate resin (PPT) and polybutylene terephthalate resin (PBT) are preferred from the viewpoints of good fluidity and impact resistance. More preferably, the polyethylene terephthalate resin (PET) is contained in an amount of not less than 10 parts by weight on the basis of 100 parts by weight of the component A2.

Specific examples of the other thermoplastic polyester resin include polypivalolactone resins and poly(ε-caprolactone) resins obtained by ring-opening polymerization of lactones, and liquid crystal polymers capable of forming a liquid crystal in a melted state (Thermotropic Liquid Crystal Polymer: TLCP). Specific examples of commercially available products of the liquid crystal polyester resins include "X7G" produced by Eastman Kodak Co., "Xyday" produced by Dartoco Corp., "Econol" produced by Sumitomo Chemical Corp., and "Vectra" produced by Ceraneed Corp.

Also, the thermoplastic polyester resin used in the present invention may have a branched structure by introducing a small amount of a branching agent thereinto. Examples of the branching agent include trimesic acid, trimelittic acid, trimethylol ethane, trimethylol propane and pentaerythritol, though not particularly limited thereto.

The polyethylene terephtalate resin especially preferably used as the component A2 in the present invention is in the form of a saturated polyester or copolyester obtained by subjecting a dicarboxylic acid component comprising terephthalic acid as a main component and a diol component comprising ethylene glycol as a main component to condensation reaction, and is a thermoplastic polyester resin containing an ethylene terephthalate unit as a repeating unit in an amount of preferably not less than 70 mol % and more preferably not less than 80 mol %.

Also, the polyethylene terephthalate resin may also contain diethylene glycol as a copolymerized component which is a side reaction product produced upon the polymerization. The amount of diethylene glycol in the polyethylene terephthalate resin is preferably not less than 0.5 mol %, but usually not more than 6 mol % and preferably not more than 5 mol % on the basis of 100 mol % of a total amount of the diol component used in the polymerization reaction.

The thermoplastic polyester resin (component A2) used in the present invention preferably has an intrinsic viscosity of 0.4 to 1.5 dL/g and more preferably 0.5 to 1.3 dL/g. The intrinsic viscosity used herein is measured at 30° C. in a solvent containing phenol and tetrachloroethane at a weight ratio of 50/50. When the intrinsic viscosity of the thermoplastic polyester resin is less than 0.4 dL/g, the resultant resin composition tends to be deteriorated in impact resistance. When the intrinsic viscosity of the thermoplastic polyester resin is more than 1.5 dL/g, the resultant resin composition tends to be deteriorated in fluidity.

The end carboxyl group content in the thermoplastic polyester resin is preferably 5 to 50 μeq/g and more preferably 10 to 30 μeq/g. When the end carboxyl group content is less than 5 μeq/g, the resultant resin composition tends to be deteriorated in impact resistance. When the end carboxyl group content is more than 50 μeg/g, the resultant resin composition tends to be insufficient in wet-heat resistance and thermal stability.

Further, as the thermoplastic polyester resin (component A2) used in the present invention, there may also be used not only the virgin resin material, but also those thermoplastic polyester resins regenerated from used resin products, i.e., so-called material-recycled thermoplastic polyester resins. Examples of the used resin products mainly include containers, films, sheets and fibers. Among these products, more preferred are containers such as PET bottles. Further, as the regenerated thermoplastic polyester resins, there may also be used nonconforming products and crushed or pulverized products obtained from sprues and runners as well as pellets obtained by melting these products.

Granular Talc (component B):

The granular talc used as the component B in the thermoplastic resin composition according to the first aspect of the present invention (hereinafter occasionally referred to merely as the "component B") is obtained by granulating a talc having an average particle size of 0.1 to 10 μm into granules having a bulk density of 0.4 to 1.5 g/mL, and is characterized by such a particle size that a proportion of a 500 μm-mesh screen residue thereof is not less than 55% by weight.

The granular talc used in the present invention is a hydrous magnesium silicate having a layer structure which is represented by the chemical formula: $4SiO_2 \cdot 3MgO \cdot H_2O$ and usually comprises 58 to 66% by weight of $SiO_2$, 28 to 35% by weight of MgO and about 5% by weight of $H_2O$. The granular talc may also comprise, as the other trace components, 0.03 to 1.2% by weight of $Fe_2O_3$, 0.05 to 1.5% by weight of $Al_2O_3$, 0.05 to 1.2% by weight of CaO, not more than 0.2% by weight of $K_2O$, not more than 0.2% by weight of $Na_2O$, etc., and has a specific gravity of about 2.7.

The granular talc used in the present invention is a granulated product obtained by granulating a talc having an average particle size of 0.1 to 10 μm (hereinafter occasionally referred to merely as the "raw material talc"). The average particle size of the raw material talc is preferably 0.3 to 8 μm and more preferably 0.7 to 5 μm. When using the raw material talc having an average particle size of not less than 0.1 μm, the resultant resin composition tends to be further enhanced in thermal stability, whereas when using the raw material talc having an average particle size of less than 10 μm, the resultant resin composition tends to be further enhanced in appearance of a molded product obtained therefrom as well as rigidity. The average particle size used herein means $D_{50}$ measured by a liquid phase precipitation method using X-ray transmission. The measurement of $D_{50}$ may be carried out, for example, by using a Sedigraph particle size analyzer "Model 5100" manufactured by Micromeritics Instruments Corp.

In addition, the granular talc used in the present invention is preferably subjected to surface treatment in order to enhance an affinity to the resin as the component A. Specific examples of the surface-treating agent include at least one compound selected from the group consisting of alcohols such as trimethylol ethane, trimethylol propane and pentaerythritol; alkanol amines such as triethylamine; higher fatty acids such as stearic acid; fatty acid metal salts such as calcium stearate and magnesium stearate; hydrocarbon-based lubricants such as polyethylene wax and liquid paraffin; basic amino acids such as lysine and alginine; polyglycerol and derivatives thereof; and coupling agents such as silane-based coupling agents, titanate-based coupling agents and aluminum-based coupling agents.

The granular talc used in the present invention has a bulk density of 0.4 to 1.5 g/mL, preferably 0.5 to 1.3 g/mL and more preferably 0.6 to 1.1 g/mL. When using the granular talc having a bulk density of not less than 0.4 g/mL, the resultant resin composition tends to be further enhanced in extrusion moldability, flame retardancy, impact resistance and thermal stability, whereas when using the granular talc having a bulk density of less than 1.5 g/mL, the resultant resin composition tends to be further enhanced in appearance of a molded product obtained therefrom as well as impact resistance.

The bulk density used herein is the value measured by the following method.

(1) The granular talc is placed on a screen having a mesh size of 1.4 mm and allowed to pass therethrough while lightly uniformly sweeping with a brush.

(2) The granular talc passed through the screen is charged into a receptacle fitted to a bulk density measuring apparatus prescribed in JIS K5101 until heaping up the receptacle with the granular talc.

(3) An upper portion of the granular talc heaped up in the receptacle is wiped off using a spatula through an inlet of the receptacle to measure a weight of the granular talc in the receptacle and calculate a bulk density of the granular talc according to the following formula.

Bulk density (g/mL)=(weight (g) of granular talc in receptacle)/(capacity (mL) of receptacle)

The granular talc used in the present invention has such a particle size that a proportion of a 500 μm-mesh screen residue thereof is not less than 55% by weight, preferably not less than 60% by weight, more preferably not less than 70% by weight and still more preferably not less than 90% by weight. When using the granular talc having such a particle size in which a proportion of a 500 μm-mesh screen residue thereof is not less than 55% by weight, the resultant resin composition of the present invention tends to be further enhanced in flame retardancy and thermal stability.

The particle size of the granular talc is the value measured by the following method according to JIS 28801.

(1) The granular talc is placed on a screen having a mesh size of 2 mm and allowed to pass therethrough while lightly uniformly sweeping with a brush.

(2) The granular talc passed through the screen is fully charged into a 200 mL beaker, and subjected to sample reduction using a sample reduction device "1305 No. 6" (groove width: 6 mm) manufactured by Furuta Seisakusho Co., Ltd., until the amount of the talc is reduced to about 30 mL.

(3) Using a screen having a mesh size of 500 μm, the granular talc thus subjected to sample reduction is sieved therethrough to determine a weight of the granular talc not passed through the 500 μm-mesh screen (screen residue; oversize) and calculate a proportion of the non-passed granular talc by dividing the thus measured weight by a whole weight of the granular talc. Meanwhile, the sieving procedure is carried out at a frequency of 120 cycles/sec for 10 min using an electromagnetic sieve "M-100 Type" manufactured by Tsutsui Rikagaku Kiki Co., Ltd.

The method for producing the granular talc used in the present invention from the raw material talc (granulation method) is optional, and the granular talc may be produced by any optional known methods. More specifically, for example, the granular talc is preferably a granulated product obtained by using a binder from the viewpoints of good flame retardancy, thermal stability, impact resistance and rigidity of the resultant resin composition.

The binder used upon producing the granular talc used in the present invention is preferably such a material which has a high granulating ability with the raw material talc, is colorless or near white color, and is inert and stable without causing deterioration in properties of the obtained resin molded product. Specific examples of the binder include clay minerals having a high caking property in a wet state such as bentonite, colloidal silica, gypsum, water-soluble polymers, waxes, higher fatty acids and resin powders. Among these binders, from the viewpoints of good thermal stability, impact resistance and rigidity of the resultant resin composition, preferred are clay minerals and water-soluble polymers, and more preferred are water-soluble polymers.

Examples of the water-soluble polymers include water-soluble polyester resins, polyvinyl alcohol, polyvinyl pyrrolidone, polyethyleneoxide, poly(sodium acrylate), sodium alginate, agar, polysaccharides (e.g., cellulose-based derivatives such as methyl cellulose, ethyl cellulose, hydroxyethyl cellulose, hydroxypropyl cellulose and sodium carboxymethyl cellulose, or starches), and proteins (such as gelatin and glues).

Among these water-soluble polymers, water-soluble polyester resins, polysaccharides and proteins are preferred because of a high caking property and a high adsorptivity to the talc. In particular, among them, from the viewpoints of good flame retardancy and impact resistance of the resultant resin composition, more preferred are water-soluble polyester resins, sodium carboxymethyl cellulose (hereinafter occasionally referred to merely as "CMC"), and gelatin, and still more preferred are CMC and water-soluble polyester resins.

In the present invention, the water-soluble polyester resins preferably used as the binder are in the form of a copolymer obtained by subjecting a dicarboxylic acid component comprising a dicarboxylic acid or a reactive derivative thereof, a diol component comprising a diol or an ester derivative thereof and a water-solubility imparting component as main raw materials, to condensation reaction, which exhibits a high solubility in water. The water solubility of the copolymer in water may be appropriately determined and may be controlled by varying a content of the water-solubility imparting component.

The dicarboxylic acid used as the raw material of the water-soluble polyester resins may be in the form of either an aromatic dicarboxylic acid or an aliphatic dicarboxylic acid. From the viewpoints of a good heat resistance of the resultant resin composition, etc., the aromatic dicarboxylic acid is preferred. Specific examples of the aromatic dicarboxylic acid include terephthalic acid, isophthalic acid, orthophthalic acid, 1,5-naphthalenedicarboxylic acid, 2,6-naphthalenedicarboxylic acid, 4,4'-biphenyl dicarboxylic acid, 4,4'-biphenylether dicarboxylic acid, 4,4'-biphenylmethane dicarboxylic acid, 4,4'-biphenylsulfone dicarboxylic acid, 4,4'-biphenylisopropylidene dicarboxylic acid, 1,2-bis(phenoxy)ethane-4,4'-dicarboxylic acid, 2,5-anthracene dicarboxylic acid, 2,6-anthracene dicarboxylic acid, 4,4'-p-terphenylene dicarboxylic acid, and 2,5-pyridine dicarboxylic acid. Further, there may also be used substituted products of these acids (for example, alkyl-substituted products such as 5-methylisophthalic acid) or reactive derivatives of these acids (for example, alkyl ester derivatives such as dimethyl terephthalate and diethyl terephthalate).

Among these aromatic dicarboxylic acids, preferred are terephthalic acid, isophthalic acid, 2,6-naphthalene dicarboxylic acid and alkyl ester derivatives of these acids. These aromatic dicarboxylic acids may be use alone or in combination of any two or more thereof. In addition, the aromatic dicarboxylic acids may be used in combination with one or more acids selected from the group consisting of aliphatic dicarboxylic acids such as adipic acid, azelaic acid, sebacic acid, dodecanedioic acid, and alicyclic dicarboxylic acids such as cyclohexane dicarboxylic acid.

Examples of the diol used as the raw material of the water-soluble polyester resins include aliphatic diols such as ethylene glycol, 1,2-propylene glycol, 1,3-propanediol, 1,4-butanediol, neopentyl glycol, 1,5-pentanediol, 1,6-hexanediol, decamethylene glycol and 2,2-dimethyl-1,3-propanediol; alicyclic diols such as 1,4-cyclohexane dimethanol, 1,3-cyclohexane dimethanol, cyclohexanediol and trans- or cis-2,2,4,4-tetramethyl-1,3-cyclobutanediol; aromatic diols such as p-xylylenediol, bisphenol A, tetrabromobisphenol A and tetrabromobisphenol A-bis(2-hydroxyethyl ether); and substituted product of these compounds.

Among these diols, from the viewpoints of a good heat resistance of the resultant resin composition, preferred are ethylene glycol, 1,3-propanediol, 1,4-butanediol and 1,4-cyclohexane dimethanol, more preferred are ethylene glycol, 1,3-propanediol and 1,4-butanediol, and most preferred is ethylene glycol. These diols may be used alone or in combination of any two or more thereof. Further, as the diol component, one or more long-chain diol having a molecular weight of 400 to 6000 such as polyethylene glycol, poly-1,3-propylene glycol and polytetramethylene glycol, may be used in combination with the above diols, and both may be copolymerized with the dicarboxylic acid component.

Examples of the water solubility imparting component used as the raw material of the water-soluble polyester resins include dicarboxylic acids containing a metal sulfonate group, and polyethylene glycol. Among these compounds, from the viewpoint of a good heat resistance, preferred are dicarboxylic acids containing a metal sulfonate group.

Examples of the dicarboxylic acids containing a metal sulfonate group include alkali metal salts such as sodium salts and potassium salts of 5-sulfo-isophthalic acid, 2-sulfo-isophthalic acid, 4-sulfo-isophthalic acid, sulfo-terephthalic acid, 4-sulfo-naphthalene-2,6-dicarboxylic acid, etc., and ester-forming derivatives of these acids. Among these compounds, from the viewpoint of a high water solubility, preferred are sodium 5-sulfo-isophthalate and ester derivatives thereof.

When the content of the dicarboxylic acid containing a metal sulfonate group is too small, the resultant polyester resins tend to be insufficient in water solubility. On the other hand, when the content of the dicarboxylic acid containing a metal sulfonate group is too large, the resultant water-soluble polyester resins tend to be insufficient in heat resistance. Therefore, the content of the dicarboxylic acid containing a metal sulfonate group in the water-soluble polyester resins is preferably 1 to 40 mol % and more preferably 5 to 35 mol % on the basis of the whole carboxylic acid component as the raw material of the water-soluble polyester resins.

Specific examples of the preferred water-soluble polyester resins as the binder for the granular inorganic filler (component B) used in the present invention include copolymers obtained from terephthalic acid, ethylene glycol and sodium 5-sulfo-isophthalate. Examples of commercially available products of the water-soluble polyester resins include "PLUSCOAT Z-221","PLUSCOAT Z-561" and "PLUSCOAT Z-446" all produced by Go-Oh Kagaku Kogyo Co., Ltd., etc.

Next, examples of the CMC preferably used as the binder in the present invention include those obtained by treating natural pulp as a raw material with sodium hydroxide to produce an alkali cellulose, and then etherifying the resultant alkali cellulose with monochloroacetic acid. The CMC may be produced by either a solvent method or an aqueous medium method. The properties of the CMC may vary depending upon the polymerization degree and etherification degree calculated from anhydrous glycol units therein. The CMC preferably used in the present invention has an average polymerization degree of 100 to 500, an etherification degree of 0.5 to 1.7 and a viscosity of a 7.1% aqueous solution of 10 to 500 mPa·s (as measured at 25° C. using a B-type viscometer) from the viewpoints of a good solubility in water and a suitable viscosity of the obtained aqueous solution. When these properties are out of the above specified ranges, the CMC tends to suffer from problems from the viewpoint of a granulating ability of the talc.

The content of the binder in the granular talc used in the present invention is preferably 0.01 to 5% by weight, more preferably 0.05 to 3.5% by weight and still more preferably 0.1 to 3% by weight on the basis of 100% by weight as the total amount of the granular talc. When the content of the binder is not less than 0.01% by weight, the granular talc tends to be hardly broken, and the resultant resin composition tends to be further enhanced in flame retardancy, thermal stability and impact resistance. On the other hand, when the content of the binder is less than 5% by weight, the granular talc tends to exhibit a good dispersibility in the resin composition, and the resultant resin composition tends to be further enhanced in appearance of a molded product obtained therefrom as well as impact resistance.

The method for producing the granular talc used in the present invention is optional and is not particularly limited. In order to enhance a kneading property between the talc and binder, impart a good plasticity to the obtained kneaded material upon production of the granules, realize a facilitated production, reduce abrasion in a granulator, and further control a hardness of the resultant granules, it is preferred to add a wetting agent to the talc and binder. Usually, the wetting agent is added to the talc and binder, if required, together with other additives such as a dispersant, and these components are mixed with each other while stirring using a mixer such as a Henschel mixer and a super-mixer, thereby obtaining a mixture of these components.

The thus obtained mixture is kneaded using a screw-type extruder such as a single-screw extruder and a twin-screw extruder, and then extruded therefrom into strands. The extruded strands are cut and granulated, and then dried using a fluidized type dryer or a band heater, thereby obtaining the granular talc. After drying, the resultant granules may be subjected to classification.

The size and shape of the granular talc are not particularly limited, and the granular talc may be of any shape such as a bar shape, a cylindrical shape, a needle-like shape, a spherical shape, a granular shape, a flake-like shape and an amorphous shape, and may be produced with various shapes by controlling molding conditions and granulating conditions depending upon the applications thereof. For example, in the case where the bar-shaped or cylindrical particles are to be produced, the axis diameter of these particles may be appropriately adjusted by varying a mesh size of a screen used in a screen-type extrusion molding machine, and the thus molded product may be granulated and then cut into a desired axis length.

The size of the granular talc is not particularly limited as long as the bulk density and particle size thereof lie within the above specified ranges. However, when dispersed in a melt kneader or a molding machine, it is more advantageous that the size of the granular talc is smaller than that of resin pellets used upon melt-kneading or molding. For example, the bar-shaped or cylindrical granular talc preferably has an average axis diameter of 0.2 to 6 mm and an average axis length of 2 to 6 mm and more preferably a ratio of an average axis diameter to an average axis length of 1:0.5 to 1:2.

Examples of the lubricant used in the present invention include water, organic solvents, etc. Among these lubricants, from the viewpoints of a low price and a good working efficiency, preferred is water which may be a mixture with alcohols. In addition, a binder may be previously dissolved or suspended in water as a wetting agent. Further, other additives required for forming granules such as, for example, a dispersant, a surfactant, various additives for synthetic resins, dyes, etc., may be dissolved or suspended in water in order to further enhance a uniformity of the resultant granules. Also, when using water as the lubricant, the water content in the granular talc is preferably controlled to not more than 1% and more preferably not more than 0.3% by drying the granular talc using a fluidized bed dryer, etc., to remove water therefrom. The drying temperature is suitably 80 to 150° C. and preferably 80 to 110° C.

The amount of the lubricant blended is 10 to 150 parts by weight, preferably 15 to 100 parts by weight and more preferably 20 to 60 parts by weight on the basis of 100 parts by weight of a total amount of the talc and binder. When the amount of the lubricant blended is less than 10 parts by weight, the effect of addition of the lubricant tends to be insufficient, whereas when the amount of the lubricant blended is more than 150 parts by weight, excessive time and energy tend to be required for removal of the lubricant, resulting in disadvantageous process.

In the present invention, it is preferred that a dispersant is blended in the granular talc in an amount of 0.05 to 2.0% by weight and preferably 0.1 to 0.5% by weight, because the granular talc can be enhanced in dispersibility in a molded product obtained from the resin composition. The dispersant used in the present invention may be generally known ones. Examples of the dispersant include the above-mentioned alcohols, alkanol amines, organic silicone-based compounds, higher fatty acids, fatty acid metal salts, hydrocarbon-based lubricants, basic amino acids, polyglycerol, and derivatives thereof. In the present invention, there may be used one or more dispersants selected from these compounds. In addition, the above surface-treated talc may be mixed with the dispersant and then granulated.

Further, in addition to the dispersant, various other additives may be added, if required, to the granular talc used in the present invention unless the addition of these additives adversely affects the features or effects of the present invention. Specific examples of the other additives include various antioxidants such as hindered phenol-based compounds, various heat stabilizers such as phosphite-based compounds, various ultraviolet absorbers such as benzotriazole-based compound, benzophenone-based compounds and triazine-based compounds, various flame retardants such as phosphate-based compounds, silicone-based compounds and metal salt-based compounds, various release agents such as olefin waxes and fatty acid ester-based compounds, antibacterial agents and mildew-proof agents such as phenol-based compounds, antistatic agents such as anionic, cationic or nonionic compounds, colorants, fillers other than talc, light stabilizers, plasticizers, and foaming agents. These additives may also be used in the form of a blended mixture of plural kinds thereof.

Rubber Polymer (Component C):

The thermoplastic resin composition according to the first aspect of the present invention preferably further comprises a rubber polymer as a component C (hereinafter occasionally referred to merely as the "component C") for the purpose of improving an impact resistance of the resin composition. The rubber polymer used in the present invention has a glass transition temperature of not higher than 0° C., in particular, not higher than −20° C., and also involves such a polymer obtained by copolymerizing the rubber polymer with a monomer component copolymerizable therewith. The component C used in the present invention may be selected from optional known rubber polymers which are generally blended in aromatic polycarbonate resin compositions, etc., to improve mechanical properties thereof.

Examples of the rubber polymer include polybutadiene, polyisoprene, diene-based copolymers (such as styrene-butadiene copolymers, acrylonitrile-butadiene copolymers and acryl-butadiene rubbers), copolymers of ethylene and α-olefin (such as ethylene-propylene copolymers, ethylene-butene copolymers and ethylene-octene copolymers), copolymers of ethylene and unsaturated carboxylic acid ester (such as ethylene-methacrylate copolymers and ethylene-butyl acrylate copolymers), copolymers of ethylene and an aliphatic vinyl compound, terpolymers of ethylene, propylene and a non-conjugated diene, acrylic rubbers (such as poly(butyl acrylate), poly(2-ethylhexyl acrylate) and butyl acrylate-2-ethylhexyl acrylate copolymers), and silicone-based rubbers (such as polyorganosiloxane rubbers and IPN-type composite rubbers comprising polyorganosiloxane rubber and poly(alkyl (meth)acrylate) rubber). These rubber polymers may be used alone or in combination of any two or more thereof. Meanwhile, the term "(meth)acrylate" means both "acrylate" and "methacrylate", and the below-mentioned term "(meth) acrylic acid" means both "acrylic acid" and "methacrylic acid".

Examples of the suitable monomer component which may be optionally copolymerized with the rubber polymer according to the requirements, include aromatic vinyl compounds, cyanided vinyl compounds, (meth)acrylate compounds, and (meth)acrylic acid compounds. Examples of the other monomer component include epoxy group-containing (meth)acrylate compounds such as glycidyl (meth)acrylate; maleimide compounds such as maleimide, N-methyl maleimide and N-phenyl maleimide; and α,β-unsaturated carboxylic acid compounds such as maleic acid, phthalic acid and itaconic acid, and anhydrides of these acids such as maleic anhydride. These monomer components may also used alone or in combination of any two or more thereof.

In order to improve an impact resistance of the thermoplastic resin composition of the present invention, a core/shell type graft copolymer is preferably used as the rubber polymer (component C). Among them, especially preferred are those core/shell type graft copolymers comprising a core layer formed from at least one rubber polymer selected from the group consisting of butadiene-containing rubbers, butyl acrylate-containing rubbers, 2-ethylhexyl acrylate-containing rubbers and silicone-based rubbers, and a shell layer formed around the core layer by copolymerizing at least one monomer component selected from the group consisting of acrylates, methacrylates and aromatic vinyl compounds. Specific examples of the core/shell type graft copolymer include methyl methacrylate-butadiene-styrene polymers (MBS), methyl methacrylate-acrylonitrile-butadiene-styrene polymers (MABS), methyl methacrylate-butadiene polymers (MB), methyl methacrylate-acrylic rubber polymers (MA), methyl methacrylate-acrylic/butadiene rubber copolymers, methyl methacrylate-acrylic/butadiene rubber-styrene copolymers, and methyl methacrylate-(acryl/silicone IPN (interpenetrating polymer network) rubber) polymers. These rubber polymers may be used alone or in combination of any two or more thereof.

Examples of commercially available products of the core/shell type graft copolymer include EXL series such as PARALOID EXL2315, EXL2602 and EXL2603, KM series such as KM330 and KMM336P, and KCZ series such as KCZ201, all produced by Rohm & Haas Japan Co., Ltd., and METHABlENE S-2001 and SRK-200 both produced by Mitsubishi Rayon Co., Ltd.

Specific examples of the other rubber polymers obtained by copolymerizing the rubber polymer with the monomer component copolymerizable therewith include polybutadiene rubbers, styrene-butadiene copolymers (SBR), styrene-butadiene-styrene block copolymers (SBS), styrene-ethylene/butylene-styrene block copolymers (SEBS), styrene-ethylene/propylene-styrene block copolymers (SEPS), ethylene-ethyl acrylate copolymers (EEA) and ethylene-methyl acrylate copolymers (EMA).

Contents:

In the thermoplastic resin composition according to the first aspect of the present invention, the contents of the constituting components A to C are as follows. That is, the content of the resin component (component A) comprising 10 to 90% by weight of the aromatic polycarbonate resin (component A1) and the thermoplastic resin other than the aromatic polycarbonate resin (component A2) with the proviso that the total content of the components A1 and A2 is 100% by weight, is 40 to 99 parts by weight; the content of the granular talc (component B) is 1 to 60 parts by weight; and the content of the rubber polymer (component C) is 0 to 35 parts by weight.

The content ratio of the component A1 to the component A2 is controlled such that the content of the component A1 is 10 to 90% by weight, preferably 25 to 90% by weight, more preferably 50 to 85% by weight and still more preferably 61 to 80% by weight on the basis of 100% by weight as a total amount of the components A1 and A2; and the content of the component A2 is 90 to 10% by weight, preferably 75 to 10% by weight, more preferably 50 to 15% by weight and still more preferably 39 to 20% by weight on the basis of 100% by weight as a total amount of the components A1 and A2. When the content of the component A1 is less than 10% by weight, the resultant resin composition tends to be insufficient in impact resistance, whereas when the content of the component A1 is more than 90% by weight, the resultant resin composition tends to be deteriorated in thermal stability, fluidity and chemical resistance.

The content of the component B is 1 to 60 parts by weight, preferably 3 to 50 parts by weight and more preferably 5 to 35 parts by weight on the basis of 100 parts by weight of a total amount of the components A, B and C. When the content of the component B is less than 1 part by weight, the resultant resin composition tends to be insufficient in rigidity, whereas when the content of the component B is more than 60 parts by weight, the resultant resin composition tends to be deteriorated in impact resistance and thermal stability.

Also, the content of the component C is 0 to 35 parts by weight, preferably 1 to 30 parts by weight and more preferably 3 to 25 parts by weight on the basis of 100 parts by weight of a total amount of the components A, B and C. When the component C is blended in an amount of not less than 1 part by weight, the resultant resin composition tends to exhibit a good impact resistance. Whereas, when the content of the component C is more than 35 parts by weight, the resultant resin composition tends to be deteriorated in thermal stability and rigidity.

Phosphorus-based Compound (Component D):

The thermoplastic resin composition according to the first aspect of the present invention preferably further comprises a phosphorus-based compound as a component D (hereinafter occasionally referred to merely as the "component D") for the purpose of improving a thermal stability and heat resistance of the resin composition, unless the addition of the component D adversely affects the aimed effects of the present invention. As the phosphorus-based compound, there may be used optional known phosphorus-based compounds. Specific examples of the phosphorus-based compound include oxo acids of phosphorus such as phosphoric acid, phosphonic acid, phosphorous acid, phosphinic acid and polyphosphoric acid; acid pyrophosphoric acid metal salts such as acid sodium pyrophosphate, acid potassium pyrophosphate and acid calcium pyrophosphate; phosphates of metals of Group 1 or Group 2B such as potassium phosphate, sodium phosphate, cesium phosphate and zinc phosphate; organic phosphate compounds; organic phosphite compounds; and organic phosphonite compounds. Among these phosphorus-based compounds, preferred are the organic phosphate compounds represented by the following general formula (I) and/or the organic phosphite compounds represented by the following general formula (II).

$$O=P(OH)_m(OR)_{3-m} \qquad (I)$$

wherein R is an alkyl group or an aryl group and the plural R groups, if any, may be the same or different; and m is an integer of 0 to 2,

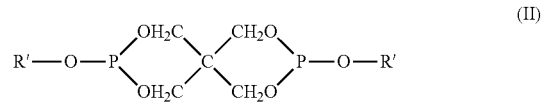

(II)

wherein R' is an alkyl group or an aryl group and the R' groups may be the same or different.

In the general formula (I), R is preferably an alkyl group having 1 to 30 carbon atoms or an aryl group having 6 to 30 carbon atoms, and more preferably an alkyl group having 2 to 25 carbon atoms; and m is preferably 1 and/or 2.

In the general formula (II), R' is preferably an alkyl group having 1 to 30 carbon atoms or an aryl group having 6 to 30 carbon atoms. Specific examples of the phosphite represented by the above general formula (II) include distearyl pentaerythritol diphosphite, bis(2,4-di-tert-butylphenyl) pentaerythritol diphosphite and bis(2,6-di-tert-butyl-4-methylphenyl) pentaerythritol diphosphite.

The content of the phosphorus-based compound is preferably 0.001 to 1 part by weight, more preferably 0.01 to 0.7 part by weight and still more preferably 0.03 to 0.5 part by weight on the basis of 100 parts by weight of a total amount of the components A, B and C.

Other Components:

The thermoplastic resin composition of the present invention may also contain various additives for resins, if required, unless the addition of these additives adversely affects the aimed effects of the present invention. Examples of the additives for resins include antioxidants, release agents, inorganic fillers other than talc, ultraviolet absorbers, dyes and pigments, flame retardants, dropping inhibitors, antistatic agents, antifogging agents, lubricants, anti-blocking agents, fluidity improvers, plasticizers, dispersants and antibacterial agents. These additives may be used in combination of any two or more thereof. Typical examples of the suitable additives usable in the thermoplastic resin composition of the present invention are more specifically explained below.

Examples of the antioxidant include hindered phenol-based antioxidants. Specific examples of the hindered phenol-based antioxidants include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylenebis[3-(3,5-di-tert-butyl-4-hydroxyphenyl)propionate], N,N'-hexane-1,6-diylbis[3-(3,5-di-tert-butyl-4-hydroxyphenyl)propionamide], 2,4-dimethyl-6-(1-methylpentadecyl)phenol, diethyl[[3,5-bis(1,1-dimethylethyl)-4-hydroxyphenyl]methyl]phosphate, 3,3',3",5,5',5"-hexa-tert-butyl-a,a',a"-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H, 3H, 5H)-trione and 2,6-di-tert-butyl-4-(4,6-bis(octylthio)-1,3,5-triazine-2-ylamino)phenol. These hindered phenol-based antioxidants may be used in combination of any two or more thereof.

Among these hindered phenol-based antioxidants, preferred are pentaerythritol tetrakis[3-(3,5-di-tert-butyl-4-hydroxyphenyl)propionate] and octadecyl-3-(3,5-di-tert-butyl-4-hydroxyphenyl)propionate. The above two phenol-based antioxidants are respectively commercially available under tradenames "IRGANOX 1010" and "IRGANOX 1076" from Ciba Specialty Chemicals, Corp.

The content of the antioxidant in the resin composition is usually 0.001 to 1 part by weight and preferably 0.01 to 0.5 part by weight on the basis of 100 parts by weight of a total amount of the components A, B and C. When the content of the antioxidant is less than 0.001 part by weight, the effect of the antioxidant added tends to be insufficient. Whereas, when the content of the antioxidant is more than 1 part by weight, the effect of the antioxidant tends to be no longer increased, resulting in uneconomical process.

As the release agent, there may be used at least one compound selected from the group consisting of aliphatic carboxylic acids, esters of aliphatic carboxylic acids and alcohols, aliphatic hydrocarbon compounds having a number-average molecular weight of 200 to 15000, and polysiloxane-based silicone oils.

Examples of the aliphatic carboxylic acids include saturated or unsaturated aliphatic mono-, di- or tri-carboxylic acids. The aliphatic carboxylic acids used herein also involve alicyclic carboxylic acids. Among them, the aliphatic carboxylic acids are preferably mono- or di-carboxylic acids having 6 to 36 carbon atoms and more preferably aliphatic saturated monocarboxylic acids having 6 to 36 carbon atoms. Specific examples of the aliphatic carboxylic acids include palmitic acid, stearic acid, caproic acid, capric acid, lauric acid, arachic acid, behenic acid, lignoceric acid, cerotic acid, melissic acid, tetratriacontanoic acid, montanoic acid, adipic acid and azelaic acid.

As the aliphatic carboxylic acids forming the esters of aliphatic carboxylic acids and alcohols, there may be used the same aliphatic carboxylic acids as described above. Examples of the alcohols include saturated or unsaturated monohydric alcohols and saturated or unsaturated polyhydric alcohols. These alcohols may contain a substituent group such as a fluorine atom and an aryl group. In particular, among these alcohols, preferred are monohydric or polyhydric saturated alcohols having not more than 30 carbon atoms, and more preferred are aliphatic saturated monohydric alcohols or polyhydric alcohols having not more than 30 carbon atoms.

The term "aliphatic" used herein also involves alicyclic compounds. Specific examples of the alcohols include octanol, decanol, dodecanol, stearyl alcohol, behenyl alcohol, ethylene glycol, diethylene glycol, glycerol, pentaerythritol, 2,2-dihydroxyperfluoropropanol, neopentyl glycol, ditrimethylol propane and dipentaerythritol.

Meanwhile, the above ester compounds may contain the aliphatic carboxylic acids and the alcohols as impurities, and may be in the form of a mixture containing a plurality of these compounds.

Specific examples of the esters of the aliphatic carboxylic acids and alcohols include beeswax (mixture comprising myricyl palmitate as a main component), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate and pentaerythritol tetrastearate.

Examples of the aliphatic hydrocarbons having a number-average molecular weight of 200 to 15000 include liquid paraffins, paraffin waxes, micro waxes, polyethylene waxes, Fischer-Tropsch waxes and α-olefin oligomers having 3 to 12 carbon atoms. The aliphatic hydrocarbons used therein also involve alicyclic hydrocarbons. In addition, these hydrocarbon compounds may be partially oxidized. Among these aliphatic hydrocarbons, preferred are paraffin waxes, polyethylene waxes and partially oxidized polyethylene waxes, and more preferred are paraffin waxes and polyethylene waxes. The number-average molecular weight of the aliphatic hydrocarbons is preferably 200 to 5000. These aliphatic hydrocarbons may be in the form of a single substance or a mixture of various substances which are different in components and molecular weight from each other as long as the content of the main component lies within the above-specified range.

Examples of the polysiloxane-based silicone oils include dimethyl silicone oils, phenylmethyl silicone oils, diphenyl silicone oils and fluorinated alkyl silicones. These silicone oils may be used in combination of any two or more thereof.

The content of the release agent in the resin composition is usually 0.001 to 2 parts by weight and preferably 0.01 to 1 part by weight on the basis of 100 parts by weight of a total amount of the components A, B and C. When the content of the release agent is less than 0.001 part by weight, the releasing effect tends to be insufficient, whereas when the content of the release agent is more than 2 parts by weight, there tend to arise problems such as deteriorated hydrolysis resistance of the resultant resin composition and contamination of a mold used upon injection molding.

Specific examples of the inorganic fillers other than talc include glass-based fillers such as glass fiber (chopped strand), glass short fiber (milled fiber), glass flakes and glass beads; carbon-based fillers such as carbon fiber, carbon short fiber, carbon nanotube and graphite; whiskers such as potassium titanate whiskers and aluminum borate whiskers; silicate compounds such as mica, wollastonite, kaolinite, zonotlite, sepiolite, attapulgite, montmorillonite, bentonite and smectite; silica; alumina; and calcium carbonate. Among these inorganic fillers, preferred are mica, wollastonite and kaolinite. These inorganic filers may be used in combination of any two or more thereof.

The content of the inorganic filler in the resin composition is usually 1 to 60 parts by weight, preferably 3 to 50 parts by weight and more preferably 5 to 30 parts by weight on the basis of 100 parts by weight of a total amount of the components A, B and C. When the content of the inorganic filler is less than 1 part by weight, the reinforcing effect tends to be insufficient, whereas when the content of the inorganic filler is more than 60 parts by weight, the resultant resin composition tends to be deteriorated in appearance and impact resistance and tends to be insufficient in fluidity.

Specific examples of the ultraviolet absorbers include inorganic ultraviolet absorbers such as cerium oxide and zinc oxide; and organic ultraviolet absorbers such as benzotriazole compounds, benzophenone compounds and triazine compounds. Among these ultraviolet absorbers, preferred are the organic ultraviolet absorbers, and more preferred is at least one compound selected from the group consisting of benzotriazole compounds, 2-(4,6-diphenyl-1,3,5-triazine-2-yl)-5-[(hexyl)oxy]-phenol, 2-[4,6-bis(2,4-dimethylphenyl)-1,3,5-triazine-2-yl)-5-(octyloxy)-phenol, 2,2'-(1,4-phenylene)bis[4H-3,1-benzoxazine-4-one], and [(4-methoxyphenyl)-methylene]-propanedioic acid dimethyl ester.

Specific examples of the benzotriazole compounds include a condensed product of methyl-3-[3-tert-butyl-5-(2H-benzotriazole-2-yl)-4-hydroxyphenyl]propionate and polyethylene glycol. Specific examples of the other benzotriazole compounds include 2-bis(5-methyl-2-hydroxyphenyl)benzotriazole, 2-(3,5-di-tert-butyl-2-hydroxyphenyl)benzotriazole, 2-(3',5'-di-tert-butyl-2'-hydroxyphenyl)-5-chlorobenzotriazole, 2-(3-tert-butyl-5-methyl-2-hydroxyphenyl)-5-chlorobenzotriazole, 2-(2'-hydroxy-5'-tert-octylphenyl)benzotriazole, 2-(3,5-di-tert-amyl-2-hydroxyphenyl)benzotriazole, 2-[2-hydroxy-3,5-bis(α,α-dimethylbenzyl)phenyl]-2H-benzotriazole, 2,2'-methylenebis[4-(1,1,3,3-tetramethylbutyl)-6-(2N-benzotriazole-2-yl)phenol], and a condensed product of [methyl-3-[3-tert-butyl-5-(2H-benzotriazole-2-yl)-4-hydroxyphenyl]propionate and polyethylene glycol. These benzotriazole compounds may be used in combination of any two or more thereof.

Among these benzotriazole compounds, preferred are 2-(2'-hydroxy-5'-tert-octylphenyl)benzotriazole, 2-[2-hydroxy-3,5-bis(α,α-dimethylbenzyl)phenyl]-2H-benzotriazole, 2-(4,6-diphenyl-1,3,5-triazine-2-yl)-5-[(hexyl)oxy]-phenol, 2-[4,6-bis(2,4-dimethylphenyl)-1,3,5-triazine-2-yl)-5-(octyloxy)-phenol and 2,2'-methylene-bis[4-(1,1,3,3-tetramethylbutyl)-6-(2N-benzotriazole-2-yl)phenol].

The content of the ultraviolet absorber in the resin composition is usually 0.01 to 3 parts by weight and preferably 0.1 to 1 part by weight on the basis of 100 parts by weight of a total amount of the components A, B and C. When the content of the ultraviolet absorber is less than 0.001 part by weight, the effect of improving a weather resistance of the resin composition tends to be insufficient, whereas when the content of the ultraviolet absorber is more than 3 parts by weight, there tend to arise problems such as mold deposits.

As the dye and pigment, there may be used inorganic pigments, organic pigments and organic dyes. Examples of the inorganic pigments include carbon blacks; sulfide-based pigments such as cadmium red and cadmium yellow; silicate-based pigments such as ultramarine blue; oxide-based pigments such as titanium oxide, zinc white, red iron oxide, chromium oxide, iron black, titanium yellow, zinc-iron-based brown, titanium/cobalt-based green, cobalt green, cobalt blue, copper/chromium-based black and copper/iron-based black; chromate-based pigments such as chrome yellow and molybdate orange; and ferrocyanide-based pigments such as Prussian blue. Examples of the organic pigment and organic dyes include phthalocyanine-based dyes and pigments such as copper phthalocyanine blue and copper phthalocyanine green; azo-based dyes and pigments such as nickel azo yellow; condensed polycyclic dyes and pigments such as thioindigo-based compounds, perynone-based compounds, perylene-based compounds, quinacridone-based compounds, dioxazine-based compounds, isoindolinone-based compounds and quinaphthalone-based compounds; and anthraquinone-based, heterocyclic and methyl-based dyes and pigments. These dyes and pigments may be used in combination of any two or more thereof. Among these dyes and pigments, from the viewpoint of a good thermal stability, preferred are titanium oxide, carbon blacks, cyanine-based compounds, quinoline-based compounds, anthraquinone-based compounds and phthalocyanine-based compounds.

The content of the dye and pigment in the resin composition is usually not more than 5 parts by weight, preferably not more than 3 parts by weight and more preferably not more than 2 parts by weight on the basis of 100 parts by weight of a total amount of the components A, B and C. When the content of the dye and pigment is more than 5 parts by weight, the resultant resin composition tend to be insufficient in impact resistance.

Examples of the flame retardant include halogen-based flame retardants such as polycarbonates of halogenated bisphenol A, brominated bisphenol-based epoxy resins, brominated bisphenol-based phenoxy resins and brominated polystyrenes; phosphate-based flame retardants; organic metal salt-based flame retardants such as dipotassium diphenyl sulfone-3,3'-disulfonate, potassium diphenyl sulfone-3-sulfonate and potassium perfluorobutane sulfonate; and polyorganosiloxane-based flame retardants. Among these flame retardants, preferred are phosphate-based flame retardants.

Specific examples of the phosphate-based flame retardants include triphenyl phosphate, resorcinol-bis(dixylenylphosphate), hydroquinone-bis(dixylenylphosphate), 4,4'-bisphenol-bis(dixylenylphosphate), bisphenol A-bis(dixylenylphosphate), resorcinol-bis(diphenylphosphate), hydroquinone-bis(diphenylphosphate), 4,4'-biphenyl-bis(diphenylphosphate) and bisphenol A-bis(diphenylphosphate). These phosphate-based flame retardants may be used in combination of any two or more thereof. Among these phosphate-based flame retardants, preferred are resorcinol-bis(dixylenylphosphate) and bisphenol A-bis(diphenylphosphate).

The content of the flame retardant in the resin composition is usually 1 to 30 parts by weight, preferably 3 to 25 parts by weight and more preferably 5 to 20 parts by weight on the basis of 100 parts by weight of a total amount of the components A, B and C. When the content of the flame retardant is less than 1 part by weight, the resultant resin composition tend to be insufficient in flame retardancy, whereas when the content of the flame retardant is more than 30 parts by weight, the resultant resin composition tend to be deteriorated in heat resistance.

Examples of the dropping inhibitor used in the present invention include fluorinated polyolefins such as polyfluoroethylene. Among these fluorinated polyolefins, especially preferred is polytetrafluoroethylene having a fibril-forming property which tends to be readily dispersed in the polymer and cause molecules of the polymer to be bonded to each other therethrough to form a fibrous material. The polytetrafluoroethylene having a fibril-forming property is classified into Type 3 according to ASTM standard. The polytetrafluoroethylene may be used in the form of not only a solid but also an aqueous dispersion. Examples of commercially available products of the polytetrafluoroethylene having a fibril-forming property include "Teflon (registered trademark) 6J" and "Teflon (registered trademark) 30J" both produced by Mitsui-DuPont Fluorochemical Co., Ltd., and "Polyflon" (tradename) produced by Daikin Kogyo Co., Ltd.

The content of the dropping inhibitor in the resin composition is usually 0.02 to 4 parts by weight and preferably 0.03 to 3 parts by weight on the basis of 100 parts by weight of a total amount of the components A, B and C. When the content of the dropping inhibitor is more than 5 parts by weight, a molded product obtained from the resultant resin composition tend to be deteriorated in appearance.

Next, the thermoplastic resin composition according to the second aspect of the present invention is explained. The thermoplastic resin composition according to the second aspect of the present invention comprises 40 to 99 parts by weight of an aromatic polycarbonate resin (component A); 1 to 60 parts by weight of a granular talc (component B) having a bulk density of 0.4 to 1.5 g/mL which is obtained by granulating a talc having an average particle size of 0.1 to 10 μm; and a rubber polymer (component C) in an amount of 3 to 35 parts by weight on the basis of 100 parts by weight of a total amount of the components A and B, wherein the granular talc (component B) has a particle size in which a proportion of a 500 μm-mesh screen residue thereof is not less than 55% by weight.

Aromatic Polycarbonate Resin (Component A):

The aromatic polycarbonate resin used as the component A in the thermoplastic resin composition according to the second aspect of the present invention (hereinafter occasionally referred to merely as the "component A") is substantially the same as the aromatic polycarbonate resin (component A1) used in the thermoplastic resin composition according to the first aspect of the present invention. Therefore, the descriptions concerning the component A1 of the thermoplastic resin composition according to the first aspect of the present invention are directly applied to the component A of the thermoplastic resin composition according to the second aspect of the present invention.

Granular Talc (Component B):

The granular talc used as the component B in the thermoplastic resin composition according to the second aspect of the present invention (hereinafter occasionally referred to merely as the "component B") is substantially the same as the granular talc (component B) used in the thermoplastic resin composition according to the first aspect of the present invention. Therefore, the descriptions concerning the component B of the thermoplastic resin composition according to the first aspect of the present invention are directly applied to the component B of the thermoplastic resin composition according to the second aspect of the present invention.

Rubber Polymer (Component C):

The rubber polymer used as the component C in the thermoplastic resin composition according to the second aspect of the present invention (hereinafter occasionally referred to merely as the "component C") is substantially the same as the rubber polymer (component C) used in the thermoplastic resin composition according to the first aspect of the present invention. Therefore, the descriptions concerning the component C of the thermoplastic resin composition according to the first aspect of the present invention are directly applied to the component C of the thermoplastic resin composition according to the second aspect of the present invention.

Contents:

In the thermoplastic resin composition according to the second aspect of the present invention, the contents of the components A to C are as follows. That is, the content of the aromatic polycarbonate resin (component A) is 40 to 99 parts by weight; the content of the granular talc (component B) is 1 to 60 parts by weight; and the content of the rubber polymer (component C) is 3 to 35 parts by weight on the basis of 100 parts by weight of a total amount of the components A and B.

The content ratio of the component A to the component B is adjusted such that the content of the component A is 40 to 99 parts by weight, preferably 50 to 97 parts by weight and more preferably 60 to 95 parts by weight on the basis of 100 parts by weight of a total amount of the components A and B; and the content of the component B is 1 to 60 parts by weight, preferably 3 to 50 parts by weight and more preferably 5 to 40 parts by weight on the basis of 100 parts by weight of a total amount of the components A and B. When the content of the component B is less than 1 part by weight, the resultant resin composition tends to be insufficient in rigidity, whereas when the content of the component B is more than 60 parts by weight, the resultant resin composition tends to be deteriorated in impact resistance and thermal stability.

Also, the content of the component C is 3 to 35 parts by weight, preferably 4 to 30 parts by weight and more preferably 5 to 25 parts by weight on the basis of 100 parts by weight of a total amount of the components A and B. When the content of the component C is less than 3 parts by weight, the resultant resin composition tends to be insufficient in thermal stability and impact resistance. Whereas, when the content of the component C is more than 35 parts by weight, the resultant resin composition tends to be deteriorated in thermal stability and rigidity.

Phosphorus-based Compound (Component D):

The thermoplastic resin composition according to the second aspect of the present invention preferably further comprises a phosphorus-based compound as a component D (hereinafter occasionally referred to merely as the "component D") for the purpose of improving a thermal stability of the resin composition unless the addition of the component D adversely affects the aimed effects of the present invention. The phosphorus-based compound used as the component D in the thermoplastic resin composition according to the second aspect of the present invention is substantially the same as the phosphorus-based compound (component D) used in the thermoplastic resin composition according to the first aspect of the present invention. Therefore, the descriptions concerning the component D of the thermoplastic resin composition according to the first aspect of the present invention are directly applied to the component D of the thermoplastic resin composition according to the second aspect of the present invention.

The content of the phosphorus-based compound in the rein composition is preferably 0.001 to 1 part by weight, more preferably 0.01 to 0.8 part by weight and still more preferably 0.03 to 0.6 part by weight on the basis of 100 parts by weight of a total amount of the components A and B.

Other Components:

The thermoplastic resin composition according to the second aspect of the present invention may also further comprise other resins or various additives for resins, if required, unless the addition of these resins and additives adversely affects the aimed effects of the present invention.

The other resins are substantially the same as the thermoplastic resin other than the aromatic polycarbonate resin (component A2) used in the thermoplastic resin composition according to the first aspect of the present invention. Therefore, the descriptions concerning the component A2 of the thermoplastic resin composition according to the first aspect of the present invention are directly applied to the other resins which may be used in the thermoplastic resin composition according to the second aspect of the present invention.

Also, the various additives for resins are substantially the same as the various additives for resins used as the other components in the thermoplastic resin composition according to the first aspect of the present invention. Therefore, the descriptions concerning the various additives for resins used in the thermoplastic resin composition according to the first aspect of the present invention are directly applied to those used in the thermoplastic resin composition according to the second aspect of the present invention. Meanwhile, the amounts of the various additives for resins blended are as follows.

The content of the antioxidant in the resin composition is usually 0.001 to 1 part by weight and preferably 0.01 to 0.5 part by weight on the basis of 100 parts by weight of a total amount of the components A, B and C. When the content of the antioxidant is less than 0.001 part by weight, the effect of the antioxidant added tends to be insufficient. Whereas, when the content of the antioxidant is more than 1 part by weight, the effect of the antioxidant tends to be no longer increased, resulting in uneconomical process.

The content of the release agent in the resin composition is usually 0.001 to 2 parts by weight and preferably 0.01 to 1 part by weight on the basis of 100 parts by weight of a total amount of the components A, B and C. When the content of the release agent is less than 0.001 part by weight, the releasing effect tends to be insufficient, whereas when the content of the release agent is more than 2 parts by weight, there tend to arise problems such as deteriorated hydrolysis resistance of the resultant resin composition and contamination of a mold used upon injection molding.

The content of the inorganic filler other than talc in the resin composition is usually 1 to 60 parts by weight, preferably 3 to 50 parts by weight and more preferably 5 to 30 parts by weight on the basis of 100 parts by weight of a total amount of the components A, B and C. When the content of the inorganic filler is less than 1 part by weight, the reinforcing effect tends to be insufficient, whereas when the content of the inorganic filler is more than 60 parts by weight, the resultant resin composition tends to be deteriorated in appearance and impact resistance and tends to be insufficient in fluidity.

The content of the ultraviolet absorber in the resin composition is usually 0.01 to 3 parts by weight and preferably 0.1 to 1 part by weight on the basis of 100 parts by weight of a total amount of the components A, B and C. When the content of the ultraviolet absorber is less than 0.001 part by weight, the effect of improving a weather resistance of the resin composition tends to be insufficient, whereas when the content of the ultraviolet absorber is more than 3 parts by weight, there tend to arise problems such as mold deposits.

The content of the dye and pigment in the resin composition is usually not more than 5 parts by weight, preferably not more than 3 parts by weight and more preferably not more than 2 parts by weight on the basis of 100 parts by weight of a total amount of the components A, B and C. When the content of the dye and pigment is more than 5 parts by weight, the resultant resin composition tend to be insufficient in impact resistance.

The content of the flame retardant in the resin composition is usually 1 to 30 parts by weight, preferably 3 to 25 parts by weight and more preferably 5 to 20 parts by weight on the basis of 100 parts by weight of a total amount of the components A, B and C. When the content of the flame retardant is less than 1 part by weight, the resultant resin composition tend to be insufficient in flame retardancy, whereas when the content of the flame retardant is more than 30 parts by weight, the resultant resin composition tend to be deteriorated in heat resistance.

The content of the dropping inhibitor in the resin composition is usually 0.02 to 4 parts by weight and preferably 0.03 to 3 parts by weight on the basis of 100 parts by weight of a total amount of the components A, B and C. When the content of the dropping inhibitor is more than 5 parts by weight, a molded product obtained from the resultant resin composition tend to be deteriorated in appearance.

Next, the thermoplastic resin composition according to the third aspect of the present invention is explained. The thermoplastic resin composition according to the third aspect of the present invention comprises 40 to 99 parts by weight of a resin component (component A) comprising 50 to 100% by weight of an aromatic polycarbonate resin (component A1) and 50 to 0% by weight of a thermoplastic resin other than the aromatic polycarbonate resin (component A2) with the proviso that a total content of the components A1 and A2 is 100% by weight; 1 to 60 parts by weight of a granular talc (component B) having a bulk density of 0.4 to 1.5 g/mL which is obtained by granulating a talc having an average particle size of 0.1 to 10 μm; and at least one flame retardant (component E) selected from the group consisting of an organic alkali metal salt and/or an organic alkali earth metal salt (component E1), an organophosphorus-based flame retardant (component E2) and a silicone-based resin (component E3), and a fluorinated polyolefin (component F), the components E and F being present in amounts of 0.01 to 40 parts by weight and 0.01 to 5 parts by weight, respectively, on the basis of 100 parts by weight of a total amount of the components A and B, wherein the granular talc (component B) has a particle size in which a proportion of a 500 μm-mesh screen residue thereof is not less than 55% by weight.

Aromatic Polycarbonate Resin (Component A1):

The aromatic polycarbonate resin used as the component A1 in the thermoplastic resin composition according to the third aspect of the present invention (hereinafter occasionally referred to merely as the "component A1") is substantially the same as the aromatic polycarbonate resin (component A1) used in the thermoplastic resin composition according to the first aspect of the present invention. Therefore, the descriptions concerning the component A1 of the thermoplastic resin composition according to the first aspect of the present invention are directly applied to the component A1 of the thermoplastic resin composition according to the third aspect of the present invention.

Thermoplastic Resin Other Than Aromatic Polycarbonate Resin (Component A2):

The thermoplastic resin other than the aromatic polycarbonate resin used as the component A2 in the thermoplastic resin composition according to the third aspect of the present invention (hereinafter occasionally referred to merely as the "component A2") is substantially the same as the thermoplastic resin other than the aromatic polycarbonate resin (component A2) used in the thermoplastic resin composition according to the first aspect of the present invention. Therefore, the descriptions concerning the component A2 according to the first aspect of the present invention are directly applied to the component A2 of the thermoplastic resin composition according to the third aspect of the present invention.

Granular Talc (Component B):

The granular talc used as the component B in the thermoplastic resin composition according to the third aspect of the present invention (hereinafter occasionally referred to merely as the "component B") is substantially the same as the granular talc (component B) used in the thermoplastic resin composition according to the first aspect of the present invention. Therefore, the descriptions concerning the component B of the thermoplastic resin composition according to the first aspect of the present invention are directly applied to the component B of the thermoplastic resin composition according to the third aspect of the present invention.

Flame Retardant (Component E):

The flame retardant used as the component E in the present invention (hereinafter occasionally referred to merely as the "component E") comprises at least one flame retardant selected from the group consisting of an organic alkali metal salt and/or an organic alkali earth metal salt (component E1), an organophosphorus-based flame retardant (component E2) and a silicone-based resin (component E3).

The organic alkali metal salt and/or the organic alkali earth metal salt used as the component E1 in the present invention (hereinafter occasionally referred to merely as the "component E1") may be selected from various known alkali and alkali earth metal salts conventionally used for imparting a flame retardancy to aromatic polycarbonate resins. In particular, among these compounds, preferred are alkali metals salts and/or alkali earth metal salts of organic sulfonic acids. The organic sulfonic acids used in the present invention may be selected from various known ones. In particular, perfluoroalkyl sulfonic acids and/or aromatic sulfonic acids are preferred especially from the viewpoint of a good flame retardancy.

Specific examples of the perfluoroalkyl sulfonic acids include trifluoromethane sulfonic acid, perfluorobutane sulfonic acid, perfluorohexane sulfonic acid and perfluorooctane sulfonic acid. These perfluoroalkyl sulfonic acids may be used alone or in combination of any two or more thereof. Among these perfluoroalkyl sulfonic acids, preferred are those containing a perfluoroalkyl group having 1 to 10 carbon atoms, more preferred are those containing a perfluoroalkyl group having 1 to 8 carbon atoms, and most preferred is perfluorobutane sulfonic acid.

Specific examples of the aromatic sulfonic acids include diphenylsulfide-4,4'-disulfonic acid, 5-sulfo-isophthalic acid, benzenesulfonic acid, dodecylbenzenesulfonic acid, naphthalene-2,6-disulfonic acid, biphenyl-3,3'-disulfonic acid, diphenylsulfone-3-sulfonic acid, diphenylsulfone-3,3'-disulfonic acid, potassium diphenylsulfoxide-4-sulfonate and naphthalenesulfonic acid.

These aromatic sulfonic acids may be used alone or in combination of any two or more thereof. Among these aromatic sulfonic acids, preferred are diphenylsulfide-4,4'-disulfonic acid, benzenesulfonic acid and dodecylbenzenesulfonic acid.

Examples of the alkali metal include lithium, sodium, potassium, rubidium and cesium. Examples of the alkali earth metal include beryllium, magnesium, calcium, strontium and barium. Among these alkali metals and alkali earth metals, preferred are lithium, sodium, potassium and cesium.

Specific examples of the preferred organic alkali metal salt and/or organic alkali earth metal salt include potassium perfluorobutanesulfonate, cesium perfluorobutanesulfonate, potassium diphenylsulfide-4,4'-disulfonate, sodium dodecylbenzenesulfonate and potassium dodecylbenzenesulfonate. Among these compounds, especially preferred is potassium perfluorobutanesulfonate.

The organophosphorus-based flame retardant used as the component E2 in the present invention (hereinafter occasionally referred to merely as the "component E2") is an organic compound containing phosphorus in a molecule thereof, and may be selected from various known organic compounds conventionally used for imparting a flame retardancy to aromatic polycarbonate resins. The organophosphorus-based flame retardant is preferably an organic phosphoric acid ester compound represented by the following general formula (1) and/or general formula (2).

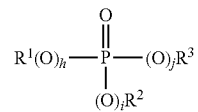

In the general formula (1), Fe, $R^2$ and $R^3$ are each independently an alkyl group having 1 to 6 carbon atoms or an aryl group having 6 to 20 carbon atoms which may be substituted with an alkyl group; and h, i and j are each independently 0 or 1.

The organic phosphoric acid ester compound represented by the above general formula (1) may be produced from phosphorus oxychloride, etc., by known methods. Specific examples of the phosphorus-based compound represented by the general formula (1) include triphenyl phosphate, tricresyl phosphate, diphenyl 2-ethylcresyl phosphate, tri(isopropylphenyl) phosphate, diphenyl methyl phosphonate, diethyl phenyl phosphonate, diphenyl cresyl phosphate and tributyl phosphate.

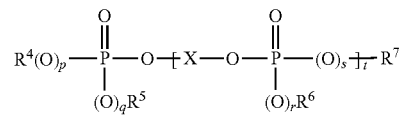

In the general formula (2), $R^4$, $R^5$, $R^6$ and $R^7$ are each independently an alkyl group having 1 to 6 carbon atoms or an aryl group having 6 to 20 carbon atoms which may be substituted with an alkyl group; p, q, r and s are each independently 0 or 1; t is an integer of 1 to 5; and X is an arylene group.

The organic phosphoric acid ester compound represented by the above general formula (2) is a condensed phosphoric acid ester in which t in the general formula (2) is 1 to 5. When using a mixture of the condensed phosphoric acid esters which are different in the number of t from each other, an average value of plural t's of the esters is determined as t of the mixture. In the general formula (2), X represents an arylene group. Examples of the arylene group include divalent groups derived from dihydroxy compounds such as resorcinol, hydroquinone and bisphenol A.

Specific examples of the organic phosphoric acid ester compound represented by the general formula (2), when using resorcinol as the dihydroxy compound, include phenyl-resorcin-polyphosphate, cresyl-resorcin-polyphosphate, phenyl-cresyl-resorcin-polyphosphate, xylyl-resorcin-polyphosphate, phenyl-p-t-butylphenyl-resorcin-polyphosphate, phenyl-isopropyl-phenyl-resorcin-polyphosphate, cresyl-xylyl-resorcin-polyphosphate, phenyl-isopropylphenyl-di-isopropylphenyl-resorcin-polyphosphate, etc.

The organophosphorus-based flame retardant used in the present invention include not only the above organic phosphoric acid ester compound, but also a phosphazen compound. Specific examples of the phosphazen compound include at least one compound selected from the group consisting of cyclic phenoxy phosphazen compounds, chain-like phenoxy phosphazen compounds and crosslinked phenoxy phosphazen compounds.

In the present invention, among the above organophosphorus-based flame retardants, preferred are the organic phosphoric acid ester compounds represented by the general formula (2), more preferred are those having an acid value of not more than 0.5 mgKOH/g, and still more preferred are those having an acid value of not more than 0.2 mgKOH/g. The acid value used herein means the value measured by dissolving the organophosphorus-based flame retardant in a mixed solvent of alcohol and ether and subjecting the obtained solution to titration with 0.5N potassium hydroxide by using phenolphthalein as an indicator.

The silicone-based resin used as the component E3 in the present invention (hereinafter occasionally referred to merely as the "component E3") may be usually selected from various optional known silicone-based resins conventionally used for imparting a flame retardancy to aromatic polycarbonate resins. In general, there may be used silicone-based resins containing an aromatic hydrocarbon group and an aliphatic hydrocarbon group having 2 or more carbon atoms as a substituent group bonding to a silicon atom. Among these silicone-based resins, preferred are those silicone-based resins in which the content of the aromatic hydrocarbon in the substituent group bonding to silicon atom is not less than 40 mol %.

Examples of the aromatic hydrocarbon group include phenyl and naphthyl. Among these groups, preferred is phenyl. The aromatic hydrocarbon group may have a substituent group such as an epoxy group, an amino group, a hydroxyl group and a vinyl group. Examples of the aliphatic hydrocarbon group having 2 or more carbon atoms include unsubstituted alkyl groups such as ethyl, propyl, butyl, pentyl and hexyl, and substituted alkyl groups containing a substituent group such as an epoxy group, an amino group, a hydroxyl group and a vinyl group. The aliphatic hydrocarbon group preferably has 2 to 12 carbon atoms.

The silicone-based resins are classified into a monofunctional to tetrafunctional types depending upon the number of oxygen atoms directly bonded to silicon atom. The silicone-based resin used in the present invention mainly comprises a bifunctional silicone type resin ($Ra_2SiO$) and a trifunctional type silicone resin ($RaSiO_{3/2}$) and may also comprise a monofunctional type silicone resin ($Ra_3SiO_{1/2}$) or a tetrafunctional type silicone resin ($SiO_2$). The substituent group Ra directly bonded to silicon atom is an aromatic hydrocarbon group and/or an aliphatic hydrocarbon group having 2 or more carbon atoms. In the silicone-based resin, the content of the aromatic hydrocarbon group in the substituent group Ra directly bonded to silicon atom is preferably not less than 40 mol % from the viewpoint of a good flame retardancy of the resultant resin composition.

The silicone-based resin may be produced by various known methods. For example, the silicone-based resin may be produced by hydrolyzing alkyl trialkoxysilanes, aryl trialkoxysilane, dialkyl dialkoxysilanes, alkyl aryl dialkoxysilanes, trialkyl alkoxysilanes, dialkyl aryl alkoxysilanes, alkyl diaryl alkoxysilanes, tetraalkoxysilanes, etc. The silicone-based resin may be controlled in molecular structure (crosslinking degree) and molecular weight by suitably adjusting a molar ratio of these raw silane compounds, hydrolysis rate, etc. Further, the raw alkoxysilanes might remain unreacted depending upon the production conditions. If the raw alkoxysilanes remain in the resin composition, the obtained resin composition tends to be deteriorated in hydrolysis resistance. Therefore, it is preferred that the amount of residual alkoxysilanes in the resin composition is smaller or no residual alkoxysilanes are present in the resin composition.

Fluorinated Polyolefin (Component F):

Examples of the fluorinated polyolefin used as the component F in the thermoplastic resin composition according to the third aspect of the present invention (hereinafter occasionally referred to merely as the "component F") include fluorinated polyolefins such as polyfluoroethylene. Among these fluorinated polyolefins, preferred is polytetrafluoroethylene having a fibril-forming property which tends to be readily dispersed in the polymer and cause molecules of the polymer to be bonded to each other therethrough to form a fibrous material.

The polytetrafluoroethylene having a fibril-forming property is classified into Type 3 according to ASTM Standard. The polytetrafluoroethylene may be used in the form of not only a solid but also an aqueous dispersion. Examples of commercially available products of the polytetrafluoroethylene having a fibril-forming property include "Teflon (registered trademark) 6J" and "Teflon (registered trademark) 30J" both produced by Mitsui-DuPont Fluorochemical Co., Ltd., and "Polyflon" (tradename) produced by Daikin Kogyo Co., Ltd.

Rubber Polymer (Component C):

The thermoplastic resin composition according to the third aspect of the present invention preferably further comprises a rubber polymer as a component C (hereinafter occasionally referred to merely as the "component C") for the purpose of improving an impact resistance of the resin composition. The component C of the thermoplastic resin composition according to the third aspect of the present invention is substantially the same as the rubber polymer (component C) used in the thermoplastic resin composition according to the first aspect of the present invention. Therefore, the descriptions concerning the component C of the thermoplastic resin composition according to the first aspect of the present invention are directly applied to the component C of the thermoplastic resin composition according to the third aspect of the present invention.

Phosphorus-based Compound (Component D):

The thermoplastic resin composition according to the third aspect of the present invention preferably further comprises a phosphorus-based compound as a component D (hereinafter occasionally referred to merely as the "component D") for the purpose of improving a thermal stability of the resin composition unless the addition of the component D adversely affects the aimed effects of the present invention. The phosphorus-based compound of the thermoplastic resin composition according to the third aspect of the present invention is substantially the same as the phosphorus-based compound (component D) used in the thermoplastic resin composition according to the first aspect of the present invention. Therefore, the descriptions concerning the component D of the thermoplastic resin composition according to the first aspect of the present invention are directly applied to the component D of the thermoplastic resin composition according to the third aspect of the present invention.

Contents:

In the thermoplastic resin composition according to the third aspect of the present invention, the contents of the components A, B, E and F constituting the resin composition are as follows. That is, the thermoplastic resin composition comprises 40 to 99 parts by weight of the resin component (component A) comprising 50 to 100% by weight of the aromatic polycarbonate resin (component A1) and 50 to 0% by weight of the thermoplastic resin other than the aromatic polycarbonate resin (component A2) with the proviso that a total content of the components A1 and A2 is 100% by weight; 1 to 60 parts by weight of the granular talc (component B); and the flame retardant (component E) and the fluorinated polyolefin (component F) in amounts of 0.01 to 40 parts by weight and 0.01 to 5 parts by weight, respectively, on the basis of 100 parts by weight of a total amount of the components A and B.

In the case where the resin composition comprises the component A2, the content ratio of the component A1 to the component A2 is adjusted such that the content of the component A1 is preferably 50 to 95% by weight, more preferably 55 to 90% by weight and still more preferably 60 to 85% by weight on the basis of 100% by weight of a total amount of the components A1 and A2; and the content of the component A2 is preferably 50 to 5% by weight, more preferably 45 to 10% by weight and still more preferably 40 to 15% by weight on the basis of 100% by weight of a total amount of the components A1 and A2. When the content of the component A1 is not less than 50% by weight, the resultant resin composition tends to be enhanced in flame retardancy and impact resistance, whereas when the content of the component A1 is less than 95% by weight, the resultant resin composition tends to be enhanced in fluidity.

Also, the content of the component B is 1 to 60 parts by weight, preferably 3 to 50 parts by weight and more preferably 5 to 40 parts by weight on the basis of 100 parts by weight of a total amount of the components A and B. When the content of the component B is less than 1 part by weight, the resultant resin composition tends to be insufficient in rigidity, whereas when the content of the component B is more than 60 parts by weight, the resultant resin composition tends to be deteriorated in impact resistance and thermal stability.

As to the component E, the content of the component E1 is preferably 0.02 to 1 part by weight, more preferably 0.03 to 0.5 part by weight and still more preferably 0.05 to 0.3 part by weight on the basis of 100 parts by weight of a total amount of the components A and B. When the content of the component E1 is not less than 0.02 part by weight, the resultant resin composition tends to be enhanced in flame retardancy, whereas when the content of the component E1 is less than 1 part by weight, the resultant resin composition tends to be enhanced in flame retardancy and thermal stability.

Also, the content of the component E2 is preferably 1 to 35 parts by weight, more preferably 3 to 30 parts by weight and still more preferably 5 to 25 parts by weight on the basis of 100 parts by weight of a total amount of the components A and B. When the content of the component E2 is not less than 1 part by weight, the resultant resin composition tends to be enhanced in flame retardancy, whereas when the content of the component E2 is less than 35 parts by weight, the resultant resin composition tends to be enhanced in heat resistance and thermal stability.

In addition, the content of the component E3 is preferably 0.1 to 5 parts by weight, more preferably 0.2 to 4 parts by weight and still more preferably 0.3 to 3 parts by weight on the basis of 100 parts by weight of a total amount of the components A and B. When the content of the component E3 is not less than 1 part by weight, the resultant resin composition tends to be enhanced in flame retardancy, whereas when the content of the component E3 is less than 5 parts by weight, the resultant resin composition tends to be enhanced in flame retardancy and impact resistance.

The content of the component F is 0.01 to 5 parts by weight, preferably 0.05 to 3.5 parts by weight and more preferably 0.1 to 2 parts by weight on the basis of 100 parts by weight of a total amount of the components A and B. When the content of the component F is less than 0.01 part by weight, the resultant resin composition tends to be insufficient in flame retardancy, whereas when the content of the component F is not less than 5 parts by weight, the resultant resin composition tends to be deteriorated in appearance of a molded product obtained from the resultant resin composition.

Next, the content of the rubber polymer (component C) is preferably 1 to 30 parts by weight, more preferably 3 to 25 parts by weight and still more preferably 5 to 20 parts by weight on the basis of 100 parts by weight of a total amount of the components A and B. When the amount of the component C blended is not less than 1 part by weight, the resultant resin composition tends to be enhanced in impact resistance, whereas when the content of the component C is less than 30 parts by weight, the resultant resin composition tends to be enhanced in rigidity and thermal stability.

Also, the content of the phosphorus-based compound (component D) is preferably 0.1 to 5 parts by weight, more preferably 0.3 to 4 parts by weight and still more preferably 0.5 to 3 parts by weight on the basis of 100 parts by weight of the granular talc (component B). When the amount of the component D blended is not less than 0.1 part by weight, the resultant resin composition tends to be enhanced in impact resistance, thermal stability and color tone, whereas when the content of the component D is more than 5 parts by weight, the resultant resin composition tends to be deteriorated in thermal stability.

Other Components:

The thermoplastic resin composition according to the third aspect of the present invention may also further comprise various additives for resins, if required, unless the addition of these additives adversely affects the aimed effects of the present invention. The various additives for resins are substantially the same as the various additives for resins used as the other components in the thermoplastic resin composition according to the first aspect of the present invention. Therefore, the descriptions concerning the various additives for resins of the thermoplastic resin composition according to the first aspect of the present invention are directly applied to those used in the thermoplastic resin composition according to the third aspect of the present invention. Meanwhile, the amounts of the various additives for resins blended are as follows.

The content of the antioxidant in the resin composition is usually 0.001 to 1 part by weight and preferably 0.01 to 0.5 part by weight on the basis of 100 parts by weight of a total amount of the components A and B. When the content of the antioxidant is less than 0.001 part by weight, the effect of the antioxidant added tends to be insufficient. Whereas, when the content of the antioxidant is more than 1 part by weight, the effect of the antioxidant tends to be no longer increased, resulting in uneconomical process.

The content of the release agent in the resin composition is usually 0.001 to 2 parts by weight and preferably 0.01 to 1 part by weight on the basis of 100 parts by weight of a total amount of the components A and B. When the content of the release agent is less than 0.001 part by weight, the releasing effect tends to be insufficient, whereas when the content of the release agent is more than 2 parts by weight, there tend to arise problems such as deteriorated hydrolysis resistance of the resultant resin composition and contamination of a mold used upon injection molding.

The content of the ultraviolet absorber in the resin composition is usually 0.01 to 3 parts by weight and preferably 0.1 to 1 part by weight on the basis of 100 parts by weight of a total amount of the components A and B. When the content of the ultraviolet absorber is less than 0.001 part by weight, the effect of improving a weather resistance of the resin composition tends to be insufficient, whereas when the content of the ultraviolet absorber is more than 3 parts by weight, there tend to arise problems such as mold deposits.

The content of the dye and pigment in the resin composition is usually not more than 5 parts by weight, preferably not more than 3 parts by weight and more preferably not more than 2 parts by weight on the basis of 100 parts by weight of a total amount of the components A and B. When the content of the dye and pigment is more than 5 parts by weight, the resultant resin composition tend to be insufficient in impact resistance.

The content of the inorganic filler other than talc in the resin composition is usually 1 to 60 parts by weight, preferably 3 to 50 parts by weight and more preferably 5 to 30 parts by weight on the basis of 100 parts by weight of a total amount of the components A and B. When the content of the inorganic filler is less than 1 part by weight, the reinforcing effect tends to be insufficient, whereas when the content of the inorganic filler is more than 60 parts by weight, the resultant resin composition tends to be deteriorated in appearance and impact resistance and tends to be insufficient in fluidity.

Next, the processes for producing the thermoplastic resin compositions according to the first to third aspects of the present invention are explained. The thermoplastic resin compositions of the present invention should not be particularly limited only to specific ones as long as they comprise the essential components for the respective thermoplastic resin compositions according to the first to third aspects of the present invention, in the amounts as specified above. Therefore, the processes for production of these thermoplastic resin compositions may also be appropriately selected depending upon the respective compositions. For example, the thermoplastic resin compositions of the present invention may be produced by extensive known methods conventionally used for producing thermoplastic resin compositions.

More specifically, the respective thermoplastic resin compositions of the present invention may be produced by previously mixing the above essential components and, if required, optional components, with each other using various mixers such as a tumbler and a Henschel mixer, and then melt-kneading the resultant mixture using a Banbury mixer, a roll, a Brabender, a single-screw kneading extruder, a twin-screw kneading extruder, a kneader, etc.

Alternatively, the respective components may be directly fed without being previously mixed, or may be fed after previously mixing only a part of the components, to the extruder through a feeder, and then melt-kneaded, thereby producing the resin composition. This method allows the component B to be fed without being previously mixed with the other components to the extruder through the feeder and melt-kneaded therewith in the extruder to produce the resin composition. Therefore, such a method is preferred from the viewpoint of extrusion molding workability because deterioration in working environmental conditions due to occurrence of scattering or dusting of the granular talc can be avoided. Further, upon production of the thermoplastic resin composition according to the third aspect of the present invention, when the component is kept in a liquid state at an ordinary temperature, from the viewpoint of a good flame retardancy of the resultant resin composition, there may be suitably used such a method in which the components other than the component E are fed into the extruder at one time on an upstream side thereof, and thereafter the component E is fed subsequent to the midstream thereof and then melt-kneaded together with the resin components fed previously.

Production of Resin Molded Product:

The process for producing a resin molded product from the respective thermoplastic resin compositions according to the first to third aspects of the present invention is not particularly limited. The resin molded product may be produced by various methods ordinarily used for molding thermoplastic resins such as an injection molding method, an ultrahigh-speed injection molding method, an injection compression molding method, a two-color molding method, a gas-assisted blow molding method, a molding method using an insulated runner mold, a molding method using a rapidly heating mold, an expansion molding method (including supercritical fluid), an insert molding method, an IMC (in-mold coating molding) method, an extrusion molding method, a sheet molding method, a thermoforming method, a rotational molding method, a lamination molding method and a press molding method. In addition, there may also be adopted such a molding method using a hot runner.

Further, in the present invention, from the viewpoints of less amount of wastes, reduction in environmental burden and low costs, upon producing the resin molded product from the resin composition, the virgin material may be mixed with recycled raw materials such as nonconforming products, sprues, runners and used products in order to realize recycling of materials (so-called material-recycling). In this case, the recycled raw materials used are preferably crushed or pulverized to prevent occurrence of defects upon producing the molded product. The content of the recycled raw materials is usually not more than 70% by weight, preferably not more than 50% by weight and more preferably not more than 30% by weight based on a total amount of the recycled raw materials and the virgin material.

EXAMPLES

The present invention is described in more detail by the following Examples. However, these Examples are only illustrative and not intended to limit a scope of the present invention. Meanwhile, in the following examples and comparative examples, Examples 1-1 to 1-16 and Comparative Examples 1-1 to 1-14 correspond to the thermoplastic resin composition according to the first aspect of the present invention; Examples 2-1 to 2-9 and Comparative Examples 2-1 to 2-5 correspond to the thermoplastic resin composition according to the second aspect of the present invention; and Examples 3-1 to 3-9 and Comparative Examples 3-1 to 3-9 correspond to the thermoplastic resin composition according to the third aspect of the present invention. In addition, in the following examples and comparative examples, the amounts of the respective components blended mean "part(s) by weight".

The following raw materials were prepared upon producing the respective resin compositions in Examples and Comparative Examples.

<Aromatic Polycarbonate Resin>

Aromatic polycarbonate resin (1): Bisphenol A-type aromatic polycarbonate produced by interfacial polymerization method ("IUPILON S-3000FN" produced by Mitsubishi Engineering-Plastics Corporation; viscosity-average molecular weight: 22,500; end hydroxyl group concentration: 150 ppm)

Aromatic polycarbonate resin (2): Bisphenol A-type aromatic polycarbonate produced by interfacial polymerization method ("IUPILON H-4000FN" produced by Mitsubishi Engineering-Plastics Corporation; viscosity-average molecular weight: 15,500; end hydroxyl group concentration: 150 ppm)

Aromatic polycarbonate resin (3): Bisphenol A-type aromatic polycarbonate produced by interfacial polymerization method ("IUPILON E-2000FN" produced by Mitsubishi Engineering-Plastics Corporation; viscosity-average molecular weight: 28,000; end hydroxyl group concentration: 150 ppm)

<Thermoplastic Resin Other than Aromatic Polycarbonate Resin>

Polyethylene terephthalate resin; "NOVAPEX GG500" produced by Mitsubishi Chemical Corporation; intrinsic viscosity: 0.76 dL/g Polybutylene terephthalate resin (1); "NOVADURAN 5020" produced by Mitsubishi Engineering-Plastics Corporation; intrinsic viscosity: 1.20 dL/g Polybutylene terephthalate resin (2); "NOVADURAN 5008" produced by Mitsubishi Engineering-Plastics Corporation; intrinsic viscosity: 0.85 dL/g ABS resin (1): acrylonitrile-butadiene-styrene copolymer; "SUNTAC AT-08" produced by Nippon A & L Co., Ltd.; butadiene rubber content: 18% by weight ABS resin (2): acrylonitrile-butadiene-styrene copolymer; "DP-611" produced by Techno-Polymer Co., Ltd.; butadiene rubber content: 40% by weight <Granular Talc>

Granular talc (1): "MTB-12" produced by Matsumura Sangyo Co., Ltd.; average particle size of talc: 1.8 p.m; bulk density: 0.74 g/mL; particle size/500 µm-mesh screen residue: 98% by weight; particle shape: cylindrical; average axis diameter: 1.2 mm; average axis length: 1.5 mm; kind of binder: CMC ("CELOGEN 7A" produced by Dai-Ichi Kogyo Seiyaku Co., Ltd.); content of binder: 0.3% by weight; lubricant: water; water content: 0.11%

Granular talc (2): "MTB-11" produced by Matsumura Sangyo Co., Ltd.; average particle size of talc: 1.8 µm; bulk density: 0.72 g/mL; particle size/500 µm-mesh screen residue: 97% by weight; particle shape: cylindrical; average axis diameter: 1.2 mm; average axis length: 1.5 mm; kind of binder: second-class glue (JIS $K_{6503}$, "AGX-5195B" produced by Nitta Gelatin Co., Ltd.); content of binder: 0.5% by weight; lubricant: water; water content: 0.12%

Granular talc (3): "MTB-5" produced by Matsumurasangyo Co., Ltd.; average particle size of talc: 1.8 µm; bulk density: 0.69 g/mL; particle size/500 µm-mesh screen residue: 92% by weight; particle shape: cylindrical; average axis diameter: 1.2 mm; average axis length: 1.5 mm; kind of binder: bentonite; content of binder: 0.5% by weight; lubricant: water; water content: 0.15%

Granular Talc (4):

A 20-L Henschel mixer was charged with 4992.5 g of talc ("HIGH-FILLER #5000PJ" produced by Matsumurasangyo Co., Ltd.) having an average particle size of 1.8 µm, and then an aqueous solution previously prepared by dissolving 7.5 g of CMC ("CELOGEN 7A" produced by Dai-Ichi Kogyo Seiyaku Co., Ltd.) in 2000 g of clean water was added thereto over 2 min while stirring the talc at a high speed by operating an agitation blade at 1500 rpm. After adding the aqueous solution, the resultant mixture was further continuously stirred for 3 min, thereby obtaining a clay-like kneaded material.

Next, the thus obtained kneaded material was extruded and granulated using a roll-basket type granulating apparatus equipped with a 1.2 µm-mesh screen, and then dried using a fluidized bed dryer at a hot air temperature of 100° C. for about 60 min, thereby obtaining a granular talc. Further, the particle size of the granular talc was uniformed using a granulator, thereby obtaining cylindrical granules having an average axis diameter of 1.2 mm and an average axis length of 1.5 mm (hereinafter referred to merely as the "granular talc (4)"). As a result, it was confirmed that the thus obtained granular talc had a bulk density of 0.68 g/mL, a particle size/500 µm-mesh screen residue of 68% by weight and a water content of 0.3%.

<Comparative Talc>

Powdery talc: "HIGH-FILLER #5000PJ" produced by Matsumurasangyo Co., Ltd.; average particle size: 1.8 µm; bulk density: 0.12 g/mL; particle size/500 µm-mesh screen residue: 0% by weight Compressed talc: "UPN HS-T0.8" produced by Hayashi Kasei Co., Ltd.; degassed compressed product; average particle size: 2 µm; bulk density: 0.8 g/mL; particle size/500 µm-mesh screen residue: 32% by weight Granular talc (5): "HiTalc HTP ultra5C" produced by IMI-FABI Corp.; average particle size: 0.5 µm; bulk density: 0.9 g/mL; particle size/500 µm-mesh screen residue: 48% by weight <Rubber Polymer>

Rubber polymer (1): Core/shell type graft copolymer comprising poly(alkyl acrylate) (core)/alkyl acrylate-alkyl methacrylate copolymer (shell); "EXL2315" produced by Rohm & Haas Japan Co., Ltd.

Rubber polymer (2): Core/shell type graft copolymer comprising polybutadiene (core)/alkyl acrylate-alkyl methacrylate copolymer (shell); "EXL2603" produced by Rohm & Haas Japan Co., Ltd.

<Flame Retardant>

Organic alkali metal salt: Potassium perfluorobutanesulfonate; "KFBS" produced by Mitsubishi Materials Corporation.

Organophosphorus-based flame retardant: Organic condensed phosphate compound (in the general formula (2), X=1,3-phenylene, $R^4$ to $R^7$=2,6-xylyl, acid value: 0.12 mgKOH/g); "ADK STAB FP-500" produced by ADEKA Corporation.

Silicone-based resin: Organosiloxane polymer containing a propyl group and a phenyl group as a substituent group bonded to silicon atom which was kept in a solid state at an ordinary temperature; "SH6018" produced by Toray Dow Corning Co., Ltd.

<Fluorinated Polyolefin>

Fluorinated polyolefin: Polytetrafluoroethylene; "POLY-FLON F-201L" produced by Daikin Kogyo Co., Ltd.

<Phosphorus-based Compound>

Phosphorus-based compound (1): Chemical formula: $O=P(OH)_n(C_{18}H_{37})_{3-n'}$ (mixture of the compound wherein n'=1 and the compound wherein n'=2); "ADK STAB AX-71" produced by ADEKA Corporation.

Phosphorus-based compound (2): Bis(2,4-di-tert-butylphenyl)pentaerythritol diphosphite; "ADK STAB PEP-24G" produced by ADEKA Corporation.

<Other Components>

Carbon black: Oil furnace carbon black; "#1000" produced by Mitsubishi Chemical Corporation.

Titanium oxide: Titanium dioxide surface-treated with methyl hydrogen polysiloxane; "TIEPAKE PC-3" produced by Ishihara Sangyo Co., Ltd.

Antioxidant: Pentaerythritol tetrakis[3-(3,5-di-tert-butyl-4-hydroxyphenyl)propionate]; "IRGANOX 1010" produced by Ciba Specialty Chemicals Corp.

Release agent: Pentaerythritol tetrastearate; "UNISTAR H476" produced by Nippon Oils & Fats Co., Ltd.

<Evaluation Methods>

The evaluation methods used in the following examples and comparative examples are shown below. Meanwhile, the methods for producing the respective test specimens are described in the following examples.

(1) Fluidity (Q Value):

Using a high load-type flow tester, the amount of the resin composition discharged per unit time (Q value; unit: cc/sec) was measured at 280° C. under a load of 160 kgf/cm² to evaluate a fluidity thereof. Meanwhile, an orifice used had a diameter of 1 mm and a length of 10 mm.

(2) Rigidity (Bending Modulus)

According to ASTM D790, a test specimen having a thickness of 6.4 mm was tested to measure a bending modulus thereof (unit: MPa) at 23° C.

(3) Impact Resistance:

a: Izod Impact Strength:

According to ASTM D256, a notched test specimen having a thickness of 3.2 mm was tested to measure an Izod impact strength thereof (unit: J/m) at 23° C.

b: Tensile Breaking Elongation:

According to ASTM D638, a test specimen having a thickness of 3.2 mm was subjected to tensile test (pulling speed: 10 mm/min) at 23° C. to measure a tensile breaking elongation thereof (unit: %).

c: Surface Impact Strength:

The above disc-shaped molded product (ordinary molded product) was subjected to impact test in which the molded product was punched at a punch diameter of ½ inch, a support diameter of 3 inch and a punching speed of 1 m/s using a high-rate impact tester (manufactured by Shimadzu Seisakusho Co., Ltd.). The larger the surface impact strength (breaking energy; unit: J), the more excellent the impact resistance.

(4) Retention Thermal Stability:

a: Surface Appearance:

The surface appearance of the above disc-shaped molded product (retention molded product) was observed by naked eyes, and evaluated as follows.

⊚: No surface roughening due to silver streak.

○: Almost no surface roughening due to silver streak.

X: Severe surface roughening due to silver streak.

b: Surface Impact Strength:

The above disc-shaped molded product (retention molded product) was subjected to impact test in which the molded product was punched at a punch diameter of ½ inch, a support diameter of 3 inch and a punching speed of 1 m/s using a high-rate impact tester (manufactured by Shimadzu Seisakusho Co., Ltd.). The larger the surface impact strength (breaking energy; unit: J), the more excellent the impact resistance.

(5) Extrusion Moldability

The extrusion moldability upon producing the resin composition was evaluated according to the following ratings.

○: Strands and pellets were readily produced with an extrusion output of not less than 40 k/h without problems such as clogging of a hopper and defective intrusion into an extruder.

X: Problems such as clogging of a hopper and defective intrusion into an extruder occurred, and strands and pellets were not produced unless reducing an extrusion output.

(6) Flame Retardancy (UL94 Standard Vertical Combustion Test):

The above-prepared combustion test specimens respectively having a thickness of 1.6 mm and 1.2 mm were subjected to vertical combustion test according to UL94 Standard to evaluate a combustibility thereof.

Examples 1-1 to 1-16 and Comparative Examples 1-1 to 1-14

Thermoplastic Resin Compositions According to the First Aspect of the Present Invention <Production of Resin Composition>

Examples 1-1 to 1-15 and Comparative Examples 1-1 to 1-11

The respective components as shown in Tables 1 to 4 were uniformly mixed at the proportions shown in the same Tables with each other using a tumbler mixer. Then, the resultant mixture was fed to a twin-screw extruder "TEX30XCT" (L/D=42; number of barrels: 12) manufactured by Nippon Seikosho Co., Ltd., through a barrel 1 thereof, melt-kneaded therein at a cylinder temperature of 270° C. and a screw rotating speed of 250 rpm, and extruded therefrom, thereby obtaining a resin composition in the form of pellets.

Example 1-16 and Comparative Examples 1-12 to 1-14

The respective components as shown in Table 5 were uniformly mixed at the proportions shown in the same Table with each other using a tumbler mixer. Then, the resultant mixture was fed to a twin-screw extruder "TEX30XCT" (L/D=42; number of barrels: 12) manufactured by Nippon Seikosho Co., Ltd., through a barrel 1 thereof, melt-kneaded therein at a cylinder temperature of 250° C. and a screw rotating speed of 250 rpm, and extruded therefrom, thereby obtaining a resin composition in the form of pellets.

<Production of Test Specimen>

Examples 1-1 to 1-3 and Comparative Examples 1-1 to 1-5

The pellets obtained from the above-produced resin composition were dried at 110° C. for 6 hr or longer, and then molded using an injection molding machine "M150AII-SJ Model" manufactured by Meiki Seisakusho Co., Ltd., at a cylinder temperature of 280° C., a mold temperature of 80° C. and a molding cycle time of 55 sec, thereby producing an ASTM test specimen and a 100 mmφ disc-shaped molded product (having a thickness of 3 mmt). Also, retention molding was carried out at a molding cycle time of 2.5 min per each cycle, and the disc-shaped retention molded products subsequent to the 5th shot were respectively subjected to evaluation of properties thereof.

Examples 1-4 to 1-15 and Comparative Examples 1-6 to 1-11

The pellets obtained from the above-produced resin composition were dried at 110° C. for 6 hr or longer, and then molded using an injection molding machine "M150AII-SJ Model" manufactured by Meiki Seisakusho Co., Ltd., at a cylinder temperature of 280° C., a mold temperature of 80° C. and a molding cycle time of 55 sec, thereby producing an ASTM test specimen and a 100 mmφ disc-shaped molded product (having a thickness of 3 mmt). Also, retention molding was carried out at a molding cycle time of 5 min per each cycle, and the disc-shaped retention molded products subsequent to the 5th shot were respectively subjected to evaluation of properties thereof.

Example 1-16 and Comparative Examples 1-12 to 1-14

The pellets obtained from the above-produced resin composition were dried at 120° C. for 6 hr or longer, and then molded using an injection molding machine "M150AII-SJ Model" manufactured by Meiki Seisakusho Co., Ltd., at a cylinder temperature of 260° C., a mold temperature of 80° C. and a molding cycle time of 55 sec, thereby producing an ASTM test specimen and a 100 mmφ disc-shaped molded product (having a thickness of 3 mmt). Also, retention molding was carried out at a molding cycle time of 5 min per each cycle, and the disc-shaped retention molded products subsequent to the 5th shot were respectively subjected to evaluation of properties thereof.

Examples 1-1 to 1-16 and Comparative Examples 1-1 to 1-14

The respective resin compositions shown in Tables 1 to 5 were produced and evaluated by the above-mentioned methods. The results are shown in Tables 1 to 5.

TABLE 1

|  | Examples | | | Comparative Examples | | | | |
| --- | --- | --- | --- | --- | --- | --- | --- | --- |
|  | 1-1 | 1-2 | 1-3 | 1-1 | 1-2 | 1-3 | 1-4 | 1-5 |
| Composition (wt. part) | | | | | | | | |
| Aromatic polycarbonate resin (1) | 63 | 63 | 63 | 90 | 85.5 | 63 | 63 | 63 |
| Polyethylene terephthalate resin | 27 | 27 | 27 | — | 4.5 | 27 | 27 | 27 |
| Granular talc (1) | 10 | — | — | 10 | 10 | — | — | — |
| Granular talc (2) | — | 10 | — | — | — | — | — | — |
| Granular talc (3) | — | — | 10 | — | — | — | — | — |
| Powdery talc | — | — | — | — | — | 10 | — | — |
| Compressed talc | — | — | — | — | — | — | 10 | — |
| Granular talc (5) | — | — | — | — | — | — | — | 10 |
| Carbon black | 0.3 | 0.3 | 0.3 | 0.3 | 0.3 | 0.3 | 0.3 | 0.3 |
| Evaluation results | | | | | | | | |
| Fluidity: Q value ($\times 10^{-2}$ cc/s) | 19 | 19 | 25 | 55 | 50 | 59 | 53 | 51 |
| Rigidity: Bending modulus (MPa) | 3650 | 3600 | 3630 | 3300 | 3340 | 3580 | 3590 | 3590 |
| Impact resistance: | | | | | | | | |
| Izod impact strength (J/m) | 50 | 45 | 40 | 28 | 30 | 25 | 27 | 28 |
| Tensile breaking elongation (%) | 110 | 100 | 80 | 9 | 11 | 8 | 9 | 10 |
| Surface impact strength (J) | 80 | 72 | 65 | 13 | 16 | 15 | 18 | 20 |
| Retention thermal stability: Surface appearance: visually observed | ○ | ○ | ○ | X | X | X | X | X |
| Extrusion moldability | ○ | ○ | ○ | ○ | ○ | X | X | X |

TABLE 2

|  | Examples | | | Comparative Examples | | |
| --- | --- | --- | --- | --- | --- | --- |
|  | 1-4 | 1-5 | 1-6 | 1-7 | 1-8 | |
| Composition (wt. part) | | | | | | |
| Aromatic polycarbonate resin (1) | 19.6 | 19.6 | 19.6 | 19.6 | 19.6 | |
| Aromatic polycarbonate resin (2) | 29.4 | 29.4 | 29.4 | 29.4 | 29.4 | |
| Polyethylene terephthalate resin | 21 | 21 | 21 | 21 | 21 | |
| Granular talc (1) | 20 | — | — | — | — | |
| Granular talc (4) | — | 20 | — | — | — | |
| Powdery talc | — | — | 20 | — | — | |
| Compressed talc | — | — | — | 20 | — | |
| Granular talc (5) | — | — | — | — | 20 | |
| Rubber polymer (1) | 10 | 10 | 10 | 10 | 10 | |
| Phosphorus-based compound | 0.2 | 0.2 | 0.2 | 0.2 | 0.2 | |
| Carbon black | 0.01 | 0.01 | 0.01 | 0.01 | 0.01 | |
| Titanium oxide | 0.3 | 0.3 | 0.3 | 0.3 | 0.3 | |
| Evaluation results | | | | | | |
| Fluidity: Q value ($\times 10^{-2}$ cc/s) | 34 | 39 | 90 | 88 | 80 | |
| Rigidity: Bending modulus (MPa) | 4100 | 3980 | 3800 | 3830 | 3970 | |
| Impact resistance: | | | | | | |
| Izod impact strength (J/m) | 55 | 45 | 28 | 29 | 29 | |
| Impact strength (J) | 53 | 36 | 2 | 3 | 3 | |
| Retention thermal stability: | | | | | | |
| Surface appearance: visually observed | ◎ | ○ | X | X | X | |
| Impact strength (J) | 45 | 18 | 1 | 1 | 1 | |
| Extrusion moldability | ○ | ○ | X | X | X | |

TABLE 3

| | Examples | | | | | |
|---|---|---|---|---|---|---|
| | 1-6 | 1-7 | 1-8 | 1-9 | 1-10 | 1-11 |
| Composition (wt. part) | | | | | | |
| Aromatic polycarbonate resin (1) | 49 | 22 | 22.4 | 56 | 20 | — |
| Aromatic polycarbonate resin (2) | — | — | 33.6 | — | 30 | — |
| Aromatic polycarbonate resin (3) | — | 20 | — | — | — | 62 |
| Polyethylene terephthalate resin | 21 | 18 | 24 | 24 | 30 | 27 |
| Granular talc (1) | 20 | 30 | 10 | 10 | 10 | 6 |
| Rubber polymer (1) | 10 | 10 | 10 | — | 10 | 5 |
| Rubber polymer (2) | — | — | — | 10 | — | — |
| Phosphorus-based compound | 0.2 | 0.3 | 0.3 | 0.1 | 0.1 | 0.05 |
| Carbon black | 0.01 | 0.01 | 0.01 | 0.01 | 0.01 | 0.01 |
| Titanium oxide | 0.3 | 0.3 | 0.3 | 0.3 | 0.3 | 0.3 |
| Evaluation results | | | | | | |
| Fluidity: Q value ($\times 10^{-2}$ cc/s) | 17 | 14 | 33 | 18 | 37 | 8 |
| Rigidity: Bending modulus (MPa) | 4080 | 5450 | 2940 | 2950 | 3050 | 2650 |
| Impact resistance: | | | | | | |
| Izod impact strength (J/m) | 92 | 60 | 97 | 360 | 83 | 700 |
| Impact strength (J) | 62 | 35 | 66 | 75 | 58 | 76 |
| Retention thermal stability: | | | | | | |
| Surface appearance: visually observed | ◎ | ◎ | ◎ | ◎ | ◎ | ◎ |
| Impact strength (J) | 53 | 18 | 59 | 52 | 48 | 62 |
| Extrusion moldability | ○ | ○ | ○ | ○ | ○ | ○ |

TABLE 4

| | Examples | | | | Comparative Examples | | |
|---|---|---|---|---|---|---|---|
| | 1-12 | 1-13 | 1-14 | 1-15 | 1-9 | 1-10 | 1-11 |
| Composition (wt. part) | | | | | | | |
| Aromatic polycarbonate resin (1) | 22.4 | 22.4 | 19.6 | — | 22.4 | 22.4 | 22.4 |
| Aromatic polycarbonate resin (2) | 33.6 | 33.6 | 29.4 | — | 33.6 | 33.6 | 33.6 |
| Aromatic polycarbonate resin (3) | — | — | — | 52 | — | — | — |
| Polybutylene terephthalate resin (1) | 24 | 19 | 17 | 22 | 24 | 24 | 24 |
| Polyethylene terephthalate resin | — | 5 | 4 | 6 | — | — | — |
| Granular talc (1) | 10 | 10 | 20 | 10 | — | — | — |
| Powdery talc | — | — | — | — | 10 | — | — |
| Compressed talc | — | — | — | — | — | 10 | — |
| Granular talc (5) | — | — | — | — | — | — | 10 |
| Rubber polymer (1) | 10 | 10 | 10 | — | 10 | 10 | 10 |
| Rubber polymer (2) | — | — | — | 10 | — | — | — |
| Phosphorus-based compound | 0.1 | 0.1 | 0.2 | 0.1 | 0.1 | 0.1 | 0.1 |
| Carbon black | 0.01 | 0.01 | 0.01 | 0.01 | 0.01 | 0.01 | 0.01 |
| Titanium oxide | 0.3 | 0.3 | 0.3 | 0.3 | 0.3 | 0.3 | 0.3 |
| Evaluation results | | | | | | | |
| Fluidity: Q value ($\times 10^{-2}$ cc/s) | 24 | 22 | 20 | 9.2 | 40 | 37 | 36 |
| Rigidity: Bending modulus (MPa) | 2840 | 2880 | 3950 | 3000 | 2760 | 2770 | 2820 |
| Impact resistance: | | | | | | | |
| Izod impact strength (J/m) | 130 | 128 | 85 | 600 | 90 | 95 | 96 |

TABLE 4-continued

|  | Examples | | | | Comparative Examples | | |
| --- | --- | --- | --- | --- | --- | --- | --- |
|  | 1-12 | 1-13 | 1-14 | 1-15 | 1-9 | 1-10 | 1-11 |
| Impact strength (J) Retention thermal stability: | 69 | 68 | 50 | 76 | 57 | 59 | 59 |
| Surface appearance: visually observed | ○ | ◎ | ○ | ◎ | X | X | X |
| Impact strength (J) | 51 | 56 | 38 | 55 | 14 | 18 | 15 |
| Extrusion moldability | ○ | ○ | ○ | ○ | X | X | X |

TABLE 5

|  | Example | Comparative Examples | | |
| --- | --- | --- | --- | --- |
|  | 1-16 | 1-12 | 1-13 | 1-14 |
| Composition (wt. part) | | | | |
| Aromatic polycarbonate resin (1) | 8 | 8 | 8 | 8 |
| Aromatic polycarbonate resin (2) | 13 | 13 | 13 | 13 |
| Polybutylene terephthalate resin (1) | 34 | 34 | 34 | 34 |
| Polybutylene terephthalate resin (2) | 15 | 15 | 15 | 15 |
| Granular talc (1) | 20 | — | — | — |
| Powdery talc | — | 20 | — | — |
| Compressed talc | — | — | 20 | — |
| Granular talc (5) | — | — | — | 20 |
| Rubber polymer (1) | 10 | 10 | 10 | 10 |
| Phosphorus-based compound | 0.2 | 0.2 | 0.2 | 0.2 |
| Carbon black | 0.3 | 0.3 | 0.3 | 0.3 |
| Evaluation results | | | | |
| Fluidity: Q value (×10$^{-2}$ cc/s) | 40 | 56 | 54 | 53 |
| Rigidity: Bending modulus (MPa) | 4100 | 3880 | 3930 | 4030 |
| Impact resistance: | | | | |
| Izod impact strength (J/m) | 46 | 35 | 36 | 36 |
| Impact strength (J) | 48 | 36 | 38 | 37 |
| Retention thermal stability: | | | | |
| Surface appearance: visually observed | ○ | X | X | X |
| Impact strength (J) | 32 | 1 | 1 | 1 |
| Extrusion moldability | ○ | X | X | X |

From the results of Examples and Comparative Examples shown in Tables 1 to 5, the followings were confirmed. The resin compositions obtained in Examples 1-1 to 1-3 according to the present invention were excellent in thermal stability, impact resistance and rigidity. On the other hand, the resin composition obtained in Comparative Example 1-1 which contained no component A2 and the resin composition obtained in Comparative Example 1-2 in which the content of the component A2 was out of the specific range defined by the present invention were deteriorated in thermal stability and impact resistance, and the resin compositions obtained in Comparative Examples 1-3 to 1-5 in which the content of the component B was out of the specific range defined by the present invention were also deteriorated in thermal stability and impact resistance.

The resin compositions obtained in Examples 1-4 to 1-11 were excellent in thermal stability, impact resistance and rigidity. On the other hand, the resin compositions obtained in Comparative Examples 1-6 to 1-8 in which the content of the component B was out of the specific range defined by the present invention were deteriorated in thermal stability and impact resistance.

The resin compositions obtained in Examples 1-12 to 1-15 were excellent in thermal stability, impact resistance and rigidity. On the other hand, the resin compositions obtained in Comparative Examples 1-9 to 1-11 in which the content of the component B was out of the specific range defined by the present invention were deteriorated in thermal stability and impact resistance.

The resin composition obtained in Example 1-16 was excellent in thermal stability, impact resistance and rigidity. On the other hand, the resin compositions obtained in Comparative Examples 1-12 to 1-14 in which the content of the component B was out of the specific range defined by the present invention were deteriorated in thermal stability and impact resistance.

Examples 2-1 to 2-9 and Comparative Examples 2-1 to 2-5

Thermoplastic Resin Compositions According to the Second Aspect of the Present Invention <Production of Resin Composition>

The respective components as shown in Tables 6 and 7 were uniformly mixed at the proportions shown in the same Tables with each other using a tumbler mixer. Then, the resultant mixture was fed to a twin-screw extruder "TEX30XCT" (L/D=42; number of barrels: 12) manufactured by Nippon Seikosho Co., Ltd., through a barrel 1 thereof, melt-kneaded therein at a cylinder temperature of 270° C. and a screw rotating speed of 250 rpm, and extruded therefrom, thereby obtaining a resin composition in the form of pellets.

<Production of Test Specimen>

The pellets obtained from the above-produced resin composition were dried at 120° C. for 6 hr or longer, and then molded using an injection molding machine "M150AII-SJ Model" manufactured by Meiki Seisakusho Co., Ltd., at a cylinder temperature of 280° C., a mold temperature of 80° C. and a molding cycle time of 55 sec, thereby producing an ASTM test specimen and a 100 mmφ disc-shaped molded product (having a thickness of 3 mmt). Also, retention molding was carried out at a molding cycle time of 4 min per each cycle, and the disc-shaped retention molded products subsequent to the 5th shot were respectively subjected to evaluation of properties thereof.

Examples 2-1 to 2-9 and Comparative Examples 2-1 to 2-5

The respective resin compositions shown in Tables 6 and 7 were produced and evaluated by the above-mentioned methods. The results are shown in Tables 6 and 7.

TABLE 6

|  | Examples | | | |
| --- | --- | --- | --- | --- |
|  | 2-1 | 2-2 | 2-3 | 2-4 |
| Composition (wt. part) | | | | |
| Aromatic polycarbonate resin (1) | 36 | 36 | 36 | 36 |
| Aromatic polycarbonate resin (2) | 54 | 54 | 54 | 54 |
| Granular talc (1) | 10 | — | — | — |
| Granular talc (2) | — | 10 | — | — |
| Granular talc (3) | — | — | 10 | — |
| Granular talc (4) | — | — | — | 10 |
| Powdery talc | — | — | — | — |
| Compressed talc | — | — | — | — |
| Granular talc (5) | — | — | — | — |
| Rubber polymer (1) | 10 | 10 | 10 | 10 |
| Phosphorus-based compound (1) | 0.1 | 0.1 | 0.1 | 0.1 |
| Carbon black | 0.3 | 0.3 | 0.3 | 0.3 |
| Evaluation results | | | | |
| Fluidity: Q value ($\times 10^{-2}$ cc/s) | 19 | 19 | 20 | 21 |
| Rigidity: Bending modulus (MPa) | 2840 | 2800 | 2790 | 2790 |
| Impact resistance: Izod impact strength (J/m) | 240 | 210 | 205 | 215 |
| Retention thermal stability: Surface appearance: visually observed | ⊚ | ○ | ○ | ○ |
| Extrusion moldability | ○ | ○ | ○ | ○ |

|  | Comparative Examples | | | | |
| --- | --- | --- | --- | --- | --- |
|  | 2-1 | 2-2 | 2-3 | 2-4 | 2-5 |
| Composition (wt. part) | | | | | |
| Aromatic polycarbonate resin (1) | 36 | 36 | 36 | 36 | 36 |
| Aromatic polycarbonate resin (2) | 54 | 54 | 54 | 54 | 54 |
| Granular talc (1) | 10 | 10 | — | — | — |
| Granular talc (2) | — | — | — | — | — |
| Granular talc (3) | — | — | — | — | — |
| Granular talc (4) | — | — | — | — | — |
| Powdery talc | — | — | 10 | — | — |
| Compressed talc | — | — | — | 10 | — |
| Granular talc (5) | — | — | — | — | 10 |
| Rubber polymer (1) | — | 2 | 10 | 10 | 10 |
| Phosphorus-based compound (1) | 0.1 | 0.1 | 0.1 | 0.1 | 0.1 |
| Carbon black | 0.3 | 0.3 | 0.3 | 0.3 | 0.3 |
| Evaluation results | | | | | |
| Fluidity: Q value ($\times 10^{-2}$ cc/s) | 30 | 28 | 22 | 20 | 20 |
| Rigidity: Bending modulus (MPa) | 3250 | 3150 | 2700 | 2730 | 2800 |
| Impact resistance: Izod impact strength (J/m) | 45 | 55 | 130 | 140 | 130 |
| Retention thermal stability: Surface appearance: visually observed | X | X | X | X | X |
| Extrusion moldability | ○ | ○ | X | X | X |

TABLE 7

|  | Examples | | | | |
| --- | --- | --- | --- | --- | --- |
|  | 2-5 | 2-6 | 2-7 | 2-8 | 2-9 |
| Composition (wt. part) | | | | | |
| Aromatic polycarbonate resin (1) | 36 | 36 | 34 | 90 | 61 |
| Aromatic polycarbonate resin (2) | 54 | 54 | 51 | — | — |
| Aromatic polycarbonate resin (3) | — | — | — | — | 33 |
| Granular talc (1) | 10 | 10 | 15 | 10 | 6 |
| Rubber polymer (1) | 10 | — | 10 | — | — |
| Rubber polymer (2) | — | 10 | — | 6 | 6 |
| Phosphorus-based compound (1) | — | 0.1 | 0.2 | 0.1 | 0.1 |
| Phosphorus-based compound (2) | 0.3 | — | — | — | — |
| Carbon black | 0.3 | 0.3 | 0.3 | 0.3 | 0.3 |
| Evaluation results | | | | | |
| Fluidity: Q value ($\times 10^{-2}$ cc/s) | 18 | 16 | 18 | 8 | 5 |
| Rigidity: Bending modulus (MPa) | 2840 | 2780 | 3300 | 3030 | 2650 |
| Impact resistance: Izod impact strength (J/m) | 235 | 280 | 125 | 330 | 680 |
| Retention thermal stability: | | | | | |
| Surface appearance: visually observed | ⊚ | ⊚ | ⊚ | ⊚ | ⊚ |
| Extrusion moldability | ○ | ○ | ○ | ○ | ○ |

From the results of Examples and Comparative Examples shown in Tables 6 and 7, the followings were confirmed. The resin compositions obtained in Examples 2-1 to 2-9 according to the present invention were excellent in thermal stability, impact resistance and rigidity. On the other hand, the resin composition obtained in Comparative Example 2-1 which contained no component C and the resin composition obtained in Comparative Example 2-2 in which the content of the component C was out of the specific range defined by the present invention were deteriorated in thermal stability and impact resistance, and the resin compositions obtained in Comparative Examples 2-3 to 2-5 in which the content of the component B was out of the specific range defined by the present invention were also deteriorated in thermal stability and impact resistance.

Examples 3-1 to 3-9 and Comparative Examples 3-1 to 3-9

Thermoplastic Resin Compositions According to the Third Aspect of the Present Invention <Production of Resin Composition and Production of Test Specimen>

Examples 3-1 to 3-4 and Comparative Examples 3-1 to 3-3

The respective components as shown in Table 8 were uniformly mixed at the proportions shown in the same Table with each other using a tumbler mixer. Then, the resultant mixture was fed to a twin-screw extruder "TEX30XCT" (L/D=42; number of barrels: 12) manufactured by Nippon Seikosho Co., Ltd., through a barrel 1 thereof, melt-kneaded therein at a cylinder temperature of 270° C. and a screw rotating speed of 300 rpm, and extruded therefrom, thereby obtaining a resin composition in the form of pellets.

The pellets obtained from the above-produced resin composition were dried at 120° C. for 6 hr or longer, and then molded using an injection molding machine "M150AII-SJ Model" manufactured by Meiki Seisakusho Co., Ltd., at a cylinder temperature of 280° C., a mold temperature of 80° C. and a molding cycle time of 55 sec, thereby producing an ASTM test specimen and a 100 mm$\phi$ disc-shaped molded product (having a thickness of 3 mmt). Also, using an injection molding machine "J50 Model" manufactured by Nippon Seikosho Co., Ltd., a UL94 Standard vertical combustion test specimen having a size of 127 mm in length×12.7 mm in width×1.6 mm or 1.2 mm in thickness was produced at a cylinder temperature of 280° C., a mold temperature of 80° C. and a molding cycle time of 50 sec.

Examples 3-5 to 3-7 and Comparative Examples 3-4 to 3-6

The respective components as shown in Table 9 were uniformly mixed at the proportions shown in the same Table with each other using a tumbler mixer. Then, the resultant mixture was fed to a twin-screw extruder "TEX30XCT" (L/D=42; number of barrels: 12) manufactured by Nippon Seikosho Co., Ltd., through a barrel 1 thereof, melt-kneaded therein at a cylinder temperature of 260° C. and a screw rotating speed of 300 rpm, and extruded therefrom, thereby obtaining a resin composition in the form of pellets.

The pellets obtained from the above-produced resin composition were dried at 100° C. for 6 hr or longer, and then molded using an injection molding machine "M150AII-SJ Model" manufactured by Meiki Seisakusho Co., Ltd., at a cylinder temperature of 270° C., a mold temperature of 80° C. and a molding cycle time of 55 sec, thereby producing an ASTM test specimen and a 100 mm$\phi$ disc-shaped molded product (having a thickness of 3 mmt). Further, retention molding was carried out at a molding cycle time of 5 min per each cycle, and the disc-shaped retention molded products subsequent to the 5th shot were respectively subjected to evaluation of properties thereof. Also, using an injection molding machine "J50 Model" manufactured by Nippon Seikosho Co., Ltd., a UL94 Standard vertical combustion test specimen having a size of 127 mm in length×12.7 mm in width×1.2 mm in thickness was produced at a cylinder temperature of 270° C., a mold temperature of 80° C. and a molding cycle time of 50 sec.

Examples 3-8 and 3-9 and Comparative Examples 3-7 to 3-9

The respective components as shown in Table 10 were uniformly mixed at the proportions shown in the same Table with each other using a tumbler mixer. Then, the resultant mixture was fed to a twin-screw extruder "TEX30XCT" (L/D=42; number of barrels: 12) manufactured by Nippon Seikosho Co., Ltd., through a barrel 1 thereof, melt-kneaded therein at a cylinder temperature of 250° C. and a screw rotating speed of 300 rpm, and extruded therefrom, thereby obtaining a resin composition in the form of pellets.

The pellets obtained from the above-produced resin composition were dried at 80° C. for 6 hr or longer, and then molded using an injection molding machine "M150AII-SJ Model" manufactured by Meiki Seisakusho Co., Ltd., at a cylinder temperature of 250° C., a mold temperature of 60° C. and a molding cycle time of 55 sec, thereby producing an ASTM test specimen and a 100 mm$\phi$ disc-shaped molded product (having a thickness of 3 mmt). Further, retention molding was carried out at a molding cycle time of 5 min per each cycle, and the disc-shaped retention molded products subsequent to the 5th shot were respectively subjected to evaluation of properties thereof. Also, using an injection molding machine "J50 Model" manufactured by Nippon Seikosho Co., Ltd., a UL94 Standard vertical combustion test specimen having a size of 127 mm in length×12.7 mm in width×1.2 mm in thickness was produced at a cylinder temperature of 250° C., a mold temperature of 60° C. and a molding cycle time of 50 sec.

Examples 3-1 to 3-9 and Comparative Examples 3-1 to 3-9

The respective resin compositions shown in Tables 8 to 10 were produced and evaluated by the above-mentioned methods. The results are shown in Tables 8 to 10.

TABLE 8

|  | Examples | | | | Comparative Examples | | |
|---|---|---|---|---|---|---|---|
|  | 3-1 | 3-2 | 3-3 | 3-4 | 3-1 | 3-2 | 3-3 |
| Composition (wt. part). | | | | | | | |
| Aromatic polycarbonate resin (1) | 80 | 80 | 90 | 85 | 80 | 80 | 80 |
| Granular talc (1) | 20 | — | — | — | — | — | — |
| Granular talc (2) | — | 20 | 10 | 15 | — | — | — |
| Powdery talc | — | — | — | — | 20 | — | — |
| Compressed talc | — | — | — | — | — | 20 | — |
| Granular talc (3) | — | — | — | — | — | — | 20 |
| Organic alkali metal salt | 0.1 | 0.1 | 0.1 | 0.05 | 0.1 | 0.1 | 0.1 |
| Silicone-based resin | — | — | — | 0.5 | — | — | — |
| Fluorinated polyolefin | 0.5 | 0.5 | 0.5 | 0.5 | 0.5 | 0.5 | 0.5 |
| Phosphorus-based compound (1) | 0.3 | 0.3 | — | 0.3 | 0.3 | 0.3 | 0.3 |
| Phosphorus-based compound (2) | — | — | 0.1 | — | — | — | — |
| Evaluation results | | | | | | | |
| Extrusion moldability | ◯ | ◯ | ◯ | ◯ | X | X | X |

TABLE 8-continued

|  | Examples | | | | Comparative Examples | | |
| --- | --- | --- | --- | --- | --- | --- | --- |
|  | 3-1 | 3-2 | 3-3 | 3-4 | 3-1 | 3-2 | 3-3 |
| Rigidity: Bending modulus (MPa) | 4650 | 4600 | 3400 | 3950 | 4450 | 4480 | 4550 |
| Flame retardancy UL94: | | | | | | | |
| 1.6 mmt | V-0 | V-0 | V-0 | V-0 | V-1 | V-1 | V-1 |
| 1.2 mmt | V-0 | V-0 | V-0 | V-0 | not-V | not-V | not-V |
| Impact resistance: Surface impact strength (J) | 29 | 37 | 59 | 48 | 11 | 13 | 12 |
| Thermal stability (ordinary molded product): Surface appearance | ○ | ○ | ○ | ○ | X | X | X |

TABLE 9

|  | Examples | | | Comparative Examples | | |
| --- | --- | --- | --- | --- | --- | --- |
|  | 3-5 | 3-6 | 3-7 | 3-4 | 3-5 | 3-6 |
| Composition (wt. part) | | | | | | |
| Aromatic polycarbonate resin (1) | 85 | 85 | 70 | 85 | 85 | 85 |
| Aromatic polycarbonate resin (2) | — | — | 20 | — | — | — |
| Granular talc (1) | 15 | — | — | — | — | — |
| Granular talc (2) | — | 15 | 10 | — | — | — |
| Powdery talc | — | — | — | 15 | — | — |
| Compressed talc | — | — | — | — | 15 | — |
| Granular talc (3) | — | — | — | — | — | 15 |
| Organic phosphorus-based flame retardant | 10 | 10 | 8 | 10 | 10 | 10 |
| Fluorinated polyolefin | 0.5 | 0.5 | 0.5 | 0.5 | 0.5 | 0.5 |
| Rubber polymer | 6 | 6 | 5 | 6 | 6 | 6 |
| Phosphorus-based compound (1) | 0.1 | 0.1 | 0.1 | 0.1 | 0.1 | 0.1 |
| Antioxidant | 0.05 | 0.05 | 0.05 | 0.05 | 0.05 | 0.05 |
| Release agent | 0.2 | 0.2 | 0.2 | 0.2 | 0.2 | 0.2 |
| Evaluation results | | | | | | |
| Extrusion moldability | ○ | ○ | ○ | ○ | ○ | ○ |
| Rigidity: Bending modulus (MPa) | 4050 | 4030 | 3400 | 3900 | 3930 | 3970 |
| Flame retardancy UL94: 1.2 mmt | V-0 | V-0 | V-0 | V-1 | V-1 | V-1 |
| Impact resistance: Surface impact strength (J) | 45 | 53 | 59 | 18 | 21 | 22 |
| Thermal stability (ordinary molded product): Surface appearance | ○ | ○ | ○ | X | X | X |

TABLE 10

|  | Examples | | Comparative Examples | | |
| --- | --- | --- | --- | --- | --- |
|  | 3-8 | 3-9 | 3-7 | 3-8 | 3-9 |
| Composition (wt. part) | | | | | |
| Aromatic polycarbonate resin (1) | 20 | 30 | 20 | 20 | 20 |
| Aromatic polycarbonate resin (3) | 40 | 34 | 40 | 40 | 40 |
| ABS resin (1) | 10 | 12 | 10 | 10 | 10 |
| ABS resin (2) | 5 | 4 | 5 | 5 | 5 |
| Granular talc (2) | 25 | 20 | — | — | — |
| Powdery talc | — | — | 25 | — | — |
| Compressed talc | — | — | — | 25 | — |
| Granular talc (3) | — | — | — | — | 25 |
| Organic phosphorus-based flame retardant | 14 | 14 | 14 | 14 | 14 |

TABLE 10-continued

|  | Examples | | Comparative Examples | | |
| --- | --- | --- | --- | --- | --- |
|  | 3-8 | 3-9 | 3-7 | 3-8 | 3-9 |
| Fluorinated polyolefin | 0.5 | 0.5 | 0.5 | 0.5 | 0.5 |
| Phosphorus-based compound (1) | 0.1 | 0.1 | 0.1 | 0.1 | 0.1 |
| Antioxidant | 0.05 | 0.05 | 0.05 | 0.05 | 0.05 |
| Release agent | 0.2 | 0.2 | 0.2 | 0.2 | 0.2 |
| Evaluation results |  |  |  |  |  |
| Extrusion moldability | ○ | ○ | X | X | X |
| Rigidity: Bending modulus (MPa) | 6400 | 5500 | 6200 | 6240 | 6300 |
| Flame retardancy UL94: 1.2 mmt | V-0 | V-0 | V-1 | V-1 | V-1 |
| Impact resistance: Surface impact strength (J) | 33 | 45 | 12 | 13 | 11 |
| Thermal stability (retention molded product): |  |  |  |  |  |
| Surface appearance | ○ | ○ | X | X | X |
| Surface impact strength (J) | 19 | 35 | 2 | 2 | 1 |

From the results of Examples and Comparative Examples shown in Tables 8 to 10, the followings were confirmed. The resin compositions obtained in Examples 3-1 to 3-4 according to the present invention were excellent in extrusion moldability, rigidity, flame retardancy, impact resistance and thermal stability. On the other hand, the resin compositions obtained in Comparative Examples 3-1 to 3-3 in which the content of the component B was out of the specific range defined by the present invention were deteriorated in extrusion moldability, flame retardancy, impact resistance and thermal stability.

The resin compositions obtained in Examples 3-5 to 3-7 were excellent in extrusion moldability, rigidity, flame retardancy, impact resistance and thermal stability. On the other hand, the resin compositions obtained in Comparative Examples 3-4 to 3-6 in which the content of the component B was out of the specific range defined by the present invention were deteriorated in flame retardancy, impact resistance and thermal stability.

The resin compositions obtained in Examples 3-8 and 3-9 were excellent in extrusion moldability, rigidity, flame retardancy, impact resistance and thermal stability. On the other hand, the resin compositions obtained in Comparative Examples 3-7 to 3-9 in which the content of the component B was out of the specific range defined by the present invention were deteriorated in extrusion moldability, flame retardancy, impact resistance and thermal stability.

Although the present invention is described above with respect to embodiments which are considered to be most practical and preferable at the present time, the present invention is not limited to these embodiments described in the present specification, and various changes and modifications will be appropriately made within the scope of claims and a whole description of the present specification unless departing from the subject matter and concept of the present invention, and it should be construed that these changes and modifications are involved in the technical scope of the present invention. Meanwhile, the present patent application is based on Japanese Patent Application (No. 2006-60303) filed on Mar. 6, 2006, Japanese Patent Application (No. 2006-60304) filed on Mar. 6, 2006 and Japanese Patent Application (No. 2006-118980) filed on Apr. 24, 2006, the entire contents of which are incorporated herein by reference thereto.

The invention claimed is:

1. A process for producing a thermoplastic resin composition comprising:
    40 to 99 parts by weight of a resin component (component A) comprising 50 to 85% by weight of an aromatic polycarbonate resin (component A1) and 50 to 15% by weight of a thermoplastic polyester resin (component A2) with the proviso that a total content of the components A1 and A2 is 100% by weight;
    1 to 60 parts by weight of a granular talc (component B) having a bulk density of 0.4 to 1.5 g/mL which is obtained by granulating a talc having an average particle size of 0.1 to 10 μm; and
    1 to 35 parts by weight of a rubber polymer (component C),
    said process comprising using said granular talc (component B) which has the particle size in which a proportion of a 500 μm-mesh screen residue thereof is not less than 97% by weight,
    which granular talc (component B) is produced by granulating said talc by using a binder and a lubricant and controlling the water content in the granular talc to not more than 1%,
    which binder comprises sodium carboxymethyl cellulose (CMC) blended in the granular talc (component B) in an amount of 0.01 to 5% by weight,
    which lubricant is water blended in an amount of 10 to 150 parts by weight on the basis of 100 parts by weight of a total amount of the material talc and binder.

2. The process according to claim 1, wherein the component A2 comprises at least 10 parts by weight of a polyethylene terephthalate resin on the basis of 100 parts by weight of the component A2.

3. The process according to claim 1, wherein a content of the rubber polymer (component C) in the composition is 1 to 30 parts by weight on the basis of 100 parts by weight of a total amount of the components A, B and C.

4. The process according to claim 1, wherein the rubber polymer (component C) is a core/shell-type graft copolymer.

5. The process according to claim 1, further comprising a phosphorus-based compound (component D) in an amount of 0.005 to 1 part by weight on the basis of 100 parts by weight of a total amount of the components A, B and C.

6. A resin molded product produced by molding the thermoplastic resin composition as defined in claim 1.

7. A process for producing a thermoplastic resin composition comprising:
    40 to 99 parts by weight of an aromatic polycarbonate resin (component A);
    1 to 60 parts by weight of a granular talc (component B) having a bulk density of 0.4 to 1.5 g/mL which is obtained by granulating a talc having an average particle size of 0.1 to 10 μm; and
    a rubber polymer (component C) in an amount of 3 to 35 parts by weight on the basis of 100 parts by weight of a total amount of the components A and B,
    said process comprising using said granular talc (component B) which has the particle size in which a proportion of a 500 μm-mesh screen residue thereof is not less than 97% by weight,
    which granular talc (component B) is produced by granulating said talc by using a binder and a lubricant and controlling the water content in the granular talc to not more than 1%, which binder comprises sodium carboxymethyl cellulose (CMC) blended in the granular talc (component B) in an amount of 0.01 to 5% by weight, which lubricant is water blended in an amount of 10 to 150 parts by weight on the basis of 100 parts by weight of a total amount of the material talc and binder.

8. The process according to claim 7, wherein a content of the rubber polymer (component C) in the resin composition is 5 to 25 parts by weight on the basis of 100 parts by weight of a total amount of the components A and B.

9. The process according to claim 7, wherein the rubber polymer (component C) is a core/shell-type graft copolymer.

10. A resin molded product produced by molding the thermoplastic resin composition as defined in claim 7.

11. A process for producing a thermoplastic resin composition comprising:
  40 to 99 parts by weight of an aromatic polycarbonate resin (component A);
  1 to 60 parts by weight of a granular talc (component B) having a bulk density of 0.4 to 1.5 g/mL which is obtained by granulating a talc having an average particle size of 0.1 to 10 µm; and
  at least one flame retardant (component E) selected from the group consisting of an organic alkali metal salt and/or an organic alkali earth metal salt (component E1), an organophosphorus-based flame retardant (component E2) and a silicone-based resin (component E3); and a fluorinated polyolefin (component F), said components E and F being present in amounts of 0.01 to 40 parts by weight and 0.01 to 5 parts by weight, respectively, on the basis of 100 parts by weight of a total amount of the components A and B,
  said process comprising using said granular talc (component B) which has the particle size in which a proportion of a 500 µm-mesh screen residue thereof is not less than 97% by weight,
  which granular talc (component B) is produced by granulating said talc by using a binder and a lubricant and controlling the water content in the granular talc to not more than 1%,
  which binder comprises sodium carboxymethyl cellulose (CMC) blended in the granulartalc (component B) in an amount of 0.01 to 5% by weight,
  which lubricant is water blended in an amount of 10 to 150 parts by weight on the basis of 100 parts by weight of a total amount of the material talc and binder.

12. The process according to claim 11, further comprising a rubber polymer (component C) in an amount of to 1 to 30 parts by weight on the basis of 100parts by weight of a total amount of the components A and B.

13. The process according to claim 12, wherein the rubber polymer (component C) is a core/shell type graft copolymer.

14. A process for producing a resin molded product comprising producing a thermoplastic resin composition by the process as defined in claim 11 and molding the thermoplastic resin.

15. The process according to claim 1, wherein the sodium carboxymethyl cellulose has an average polymerization degree of 100 to 500, an etherification degree of 0.5 to 1.7 and a viscosity of a 7.1% aqueous solution of 10 to 500 mPa·s (as measured at 25° C. using a B-type viscometer).

16. The process according to claim 7, wherein the sodium carboxymethyl cellulose has an average polymerization degree of 100 to 500, an etherification degree of 0.5 to 1.7 and a viscosity of a 7.1% aqueous solution of 10 to 500 mPa·s (as measured at 25° C. using a B-type viscometer).

17. The process according to claim 11, wherein the sodium carboxymethyl cellulose has an average polymerization degree of 100 to 500, an etherification degree of 0.5 to 1.7 and a viscosity of a 7.1% aqueous solution of 10 to 500 mPa·s (as measured at 25° C. using a B-type viscometer).

* * * * *